United States Patent
Kim et al.

(10) Patent No.: US 9,591,680 B2
(45) Date of Patent: Mar. 7, 2017

(54) METHOD FOR CONTROLLING SYSTEM INCLUDING ELECTRONIC TAG, MOBILE DEVICE, AND DISPLAY DEVICE, AND MOBILE DEVICE AND DISPLAY DEVICE OF THE SAME

(71) Applicant: LG ELECTRONICS INC., Seoul (KR)

(72) Inventors: Ryoung Kim, Pyeongtaek-si (KR); Kihyung Kim, Pyeongtaek-si (KR)

(73) Assignee: LG ELECTRONICS INC., Seoul (KR)

( * ) Notice: Subject to any disclaimer, the term of this patent is extended or adjusted under 35 U.S.C. 154(b) by 101 days.

(21) Appl. No.: 13/830,055

(22) Filed: Mar. 14, 2013

(65) Prior Publication Data
US 2014/0141721 A1    May 22, 2014

(30) Foreign Application Priority Data

Nov. 21, 2012   (KR) .................. 10-2012-0132233

(51) Int. Cl.
*H04W 76/02*  (2009.01)
*H04M 1/725*  (2006.01)

(52) U.S. Cl.
CPC ....... *H04W 76/023* (2013.01); *H04M 1/7253* (2013.01)

(58) Field of Classification Search
CPC ... H04W 76/023; H04W 4/008; H04W 12/04; H04W 84/18; H04M 1/7253; H04B 5/0031; H04L 67/16; H04L 2209/80; H04N 21/4334; H04N 21/47214; H04N 7/163; H04N 21/41407
See application file for complete search history.

(56) References Cited

U.S. PATENT DOCUMENTS

| | | | |
|---|---|---|---|
| 2009/0170431 A1* | 7/2009 | Pering et al. | 455/41.1 |
| 2010/0040029 A1* | 2/2010 | Doppler et al. | 370/338 |
| 2010/0093278 A1* | 4/2010 | Abel | H04B 5/0031 455/41.1 |
| 2010/0105361 A1* | 4/2010 | Borcic et al. | 455/412.2 |
| 2010/0278515 A1* | 11/2010 | Shimazaki | 386/291 |
| 2010/0325425 A1* | 12/2010 | Park et al. | 713/155 |
| 2012/0077436 A1* | 3/2012 | Konded | G06F 3/04883 455/41.2 |
| 2012/0208461 A1* | 8/2012 | Choi et al. | 455/41.2 |

(Continued)

FOREIGN PATENT DOCUMENTS

CN        102638322 A       8/2012

OTHER PUBLICATIONS

Adams, WiFi Direct File Transfer, Sep. 2012 https://play.google.com/store/apps/details?id=ca.nickadams.wifi.direct.file.transfer.*

(Continued)

*Primary Examiner* — Ping Hsieh
*Assistant Examiner* — James Yang
(74) *Attorney, Agent, or Firm* — Birch, Stewart, Kolasch & Birch, LLP

(57) ABSTRACT

A system and method for processing a faster connection to at least two or more devices for sharing contents, by using an electronic tag, and enhancing data processing efficiency and minimizing unnecessary or excessive usage of memory during the connection process to the at least two or more devices for sharing contents.

8 Claims, 29 Drawing Sheets

(56) References Cited

U.S. PATENT DOCUMENTS

| | | | |
|---|---|---|---|
| 2012/0236208 A1* | 9/2012 | Chun | 348/730 |
| 2013/0170392 A1* | 7/2013 | Wyler | H04W 4/008 370/254 |
| 2014/0109012 A1* | 4/2014 | Choudhary | G06F 3/0483 715/838 |

OTHER PUBLICATIONS

Segev, Hidden features exposed with my hands on review of the Samsung Galaxy SIII, Jun. 2012 http://thetechieguy.com/hidden-features-exposed-with-my-hands-on-review-of-the-samsung-galaxy-siii/.*

TechNorms, Amazon Cloud Player, 2011 http://www.technorms.com/3797/amazon-cloud-player-review.*

Wikipedia, Wi-Fi Direct, Sep. 2012 https://web.archive.org/web/20120923062426/http://en.wikipedia.org/wiki/Wi-Fi_Direct.*

Khalid, transfer photos over wifi, Aug. 8, 2012 http://www.addictivetips.com/ios/send-photos-videos-to-iphone-over-wi-fi-share-over-social-networks/.*

Lee, How to Use AirPlay Mirroring, 2011 http://www.idownloadblog.com/2011/10/16/how-to-use-airplay-mirroring/.*

Apple, iPhone-4S-User-Guide-iOS-5.0, 2011 http://www.iphone4smanual.com/wp-content/uploads/2012/10/Apple-iPhone-4S-User-Guide-iOS-5.0.pdf.*

Bergen, T-Moble Caller ID, 2011 http://www.geek.com/mobile/t-mobile-becomes-first-major-us-carrier-to-add-caller-id-feature-1402597/.*

Bluetooth pairing, YouTube, Sep. 2012 https://www.youtube.com/watch?v=JGTPj_bDNTI.*

Ogg, Turning your smartphone, 2011 http://Www.cnet.com/news/turning-your-smartphone-into-a-smarter-tv-remote/.*

Android Enthusiasts, DLNA and Miracast, Nov. 2, 2012 http://android.stackexchange.com/questions/32730/what-the-difference-between-miracast-and-dlna.*

Ableremote,The ultimate Google TV remote, Sep. 2012 https://web.archive.org/web/20120905152551/http://ableremote.com/.*

Hui, "Wireless Interconnection between Laptop and Android Terminal," Computer Knowledge and Technology, Issue 7, pp. 80-82, Jul. 30, 2012, with English translation.

Tan, "Must-have for Players, 300 Hot Software for Android Cell Phone," Tsinghua University Press, Apr. 2014, pp. 11-12.

* cited by examiner (a)

(b)

METHOD FOR CONTROLLING SYSTEM INCLUDING ELECTRONIC TAG, MOBILE DEVICE, AND DISPLAY DEVICE, AND MOBILE DEVICE AND DISPLAY DEVICE OF THE SAME

This application claims the benefit of the Korean Patent Application No. 10-2012-0132233, filed on Nov. 21, 2012, which is hereby incorporated by reference as if fully set forth herein.

BACKGROUND OF THE INVENTION

Field of the Invention

The present invention relates to system related to at least one or more electronic tags and, more particularly, to a method for controlling a system including an electronic tag, a mobile device, and a display device, and a mobile device and a display device of the same.

Discussion of the Related Art

In the related art system, the communication function was equipped only in a selected group of products, and the applicability of such communication function was also very limited. Recently, however, discussion on the research and development of a technology for successively outputting contents being outputted from a first device through a second device is in progress.

However, in order to realize such technology, a communication set-up process is required to be made between the first device and the second device, and the user is required to manually input information on the two or more devices, which the user wishes to be connected to. Additionally, when the user attempts to perform such set-up process each time he (or she) wishes to be connected to other devices, an unnecessary data processing procedure may be made and a considerable amount of processing time may be required.

SUMMARY OF THE INVENTION

Accordingly, the present invention is directed to a method for controlling a system including an electronic tag, a mobile device, and a display device, and a mobile device and a display device of the same that substantially obviate one or more problems due to limitations and disadvantages of the related art.

An object of the present invention is to provide a method for controlling a system including an electronic tag, a mobile device, and a display device, and a mobile device and a display device of the same that can define a third device, which may process a faster connection to at least two or more devices for sharing contents.

Another object of the present invention is to provide a method for controlling a system including an electronic tag, a mobile device, and a display device, and a mobile device and a display device of the same that can provide a solution for enhancing data processing efficiency and for minimizing unnecessary (or excessive) usage of memory during the connection process to at least two or more devices for sharing contents.

A further object of the present invention is to provide a method for controlling a system including an electronic tag, a mobile device, and a display device, and a mobile device and a display device of the same that can provide the user with a more convenient and faster interface during the connection process to at least two or more devices for sharing contents.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in a system including an electronic tag, a mobile device, and a display device, a method for controlling the system includes the steps of, when the mobile device is positioned within a predetermined range from the electronic tag, transmitting data stored in the electronic tag to the mobile device from the electronic tag, having the mobile device determine whether or not pairing information is included in the stored data, when pairing information is included in the stored data, establishing wireless communication connection between the display device being identified by the pairing information and the mobile device, having the mobile device display at least two or more options for selecting a device correspond to a content that is to be outputted, when a first option is selected, transmitting the content that is currently being outputted through the mobile device to the display device, and, when a second option is selected, transmitting the content that is currently being outputted through the display device to the mobile device.

According to another aspect of the present invention, a mobile device available for communication with an electronic tag and a display device includes a first communication module receiving data stored in the electronic tag from the electronic tag, when the first communication module is positioned within a predetermined range from the electronic tag, a recognition module recognizing pairing information included in the stored data, a second communication module establishing a wireless communication connection with a display device, the display device being identified by the pairing information, a screen displaying at least two or more options for selecting a device corresponding to a content that is to be outputted, a touch sensor sensing at least one or more of a touch position within the screen and a touch direction, and a controller controlling the second communication module, so as to transmit the content currently being outputted to the display device, when a first option is sensed by the touch sensor, and controlling the second communication module, so as to have the display device receive the content currently being outputted, when a second option is sensed by the touch sensor.

According to a further aspect of the present invention, a display device available for communication with a mobile device includes a display module outputting video data of a first content currently being executed, a communication module establishing wireless communication connection with the mobile device, by using pairing information pre-stored in a memory of the mobile device, a decoder pre-decoding a second content currently being outputted from the mobile device, after the decoder has received a first command from the mobile device by using the communication module, and a controller interrupting a decoding process of video data of the first content, after the controller has received a second command from the mobile device by using the communication module, wherein the controller performs controlling operations so as to output the second content through the display module instead of the first content.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

The present invention will now be described in more detail with reference to the accompanying drawings.

The suffixes "module" and "unit" that are mentioned in the elements used to describe the present invention are merely used for the purpose of simplifying the description of the present invention. Therefore, the suffixes "module" and "unit" may also be alternately used for the reference of a specific element of the present invention.

Reference will now be made in detail to the preferred embodiments of the present invention, examples of which are illustrated in the accompanying drawings. However, the embodiment of the present invention described below may be modified to a wide range of modifications. And, therefore, it should be understood that the present invention will not be limited only to the example presented in the description of the present invention set forth herein.

Although the terms used in the present invention are selected from generally known and used terms, the terms used herein may be varied or modified in accordance with the intentions or practice of anyone skilled in the art, or along with the advent of a new technology. Alternatively, in some particular cases, some of the terms mentioned in the description of the present invention may be selected by the applicant at his or her discretion, the detailed meanings of which are described in relevant parts of the description herein. Furthermore, it is required that the present invention is understood not simply by the actual terms used but by the meaning of each term lying within.

Figure 1:
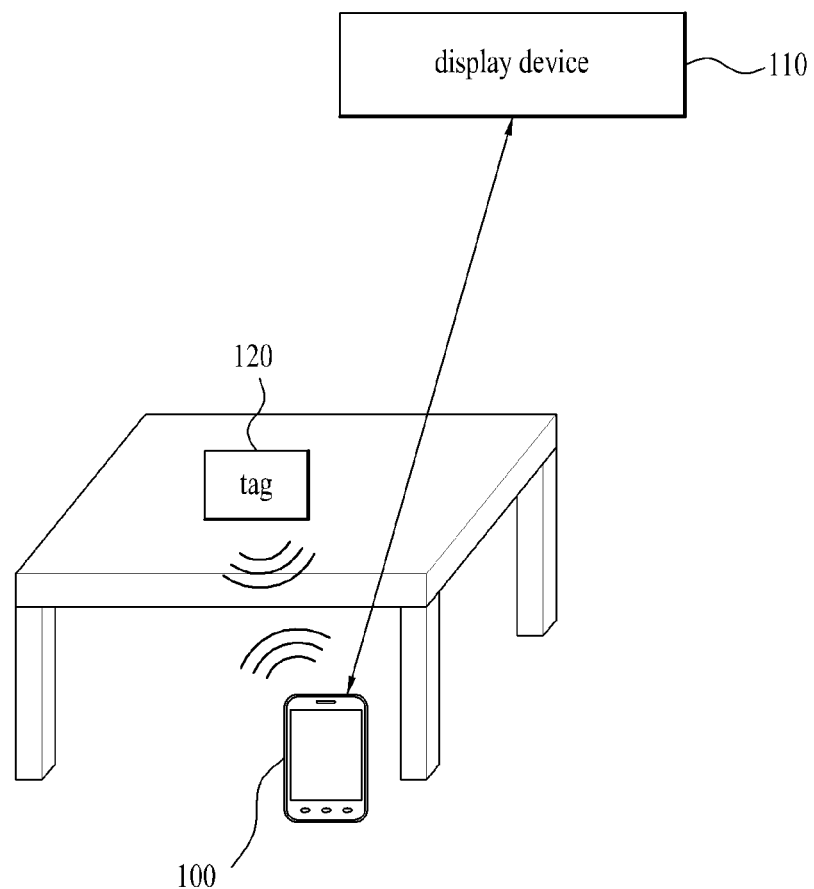
FIG. 1 illustrates an overall view of a system including an electronic tag, a mobile device, and a display device according to an exemplary embodiment of the present invention.

FIG. 1 illustrates an overall view of a system including an electronic tag, a mobile device, and a display device according to an exemplary embodiment of the present invention. Evidently, the scope of the present invention will not be limited only to the exemplary case of the system including a mobile device 100, a display device 110, and an electronic tag 120. And, depending upon the requirements made by anyone skilled in the art, it will be apparent that the scope of the present invention may include only any one of the mentioned devices.

For example, the mobile device 100 may correspond to a mobile phone, a smart phone, a tablet personal computer (PC), and so on. And, the display device 110 may correspond to a television (TV) receiver, a digital television (DTV), a smart TV, and HBBTV, an IPTV, and so on. And, the electronic tag 120 corresponds to a compact device being equipped with a Near Field Communication (NFC) or Radio Frequency Identification (RFID) sensor. Accordingly, the mobile device 100 may also be designed to be equipped with an NFC or RFID sensor.

More specifically, according to an aspect of the present invention, additional information for performing a communication pairing connection between the display device 110 and the mobile device 100 is designed to be stored in a memory of the electronic tag 120. Accordingly, the mobile device 100 is not required to always store unnecessary pairing information. Also, it will also be advantageous in that all complex processes for performing communication connection between the two devices 100 and 110 may all be omitted.

Figure 2:
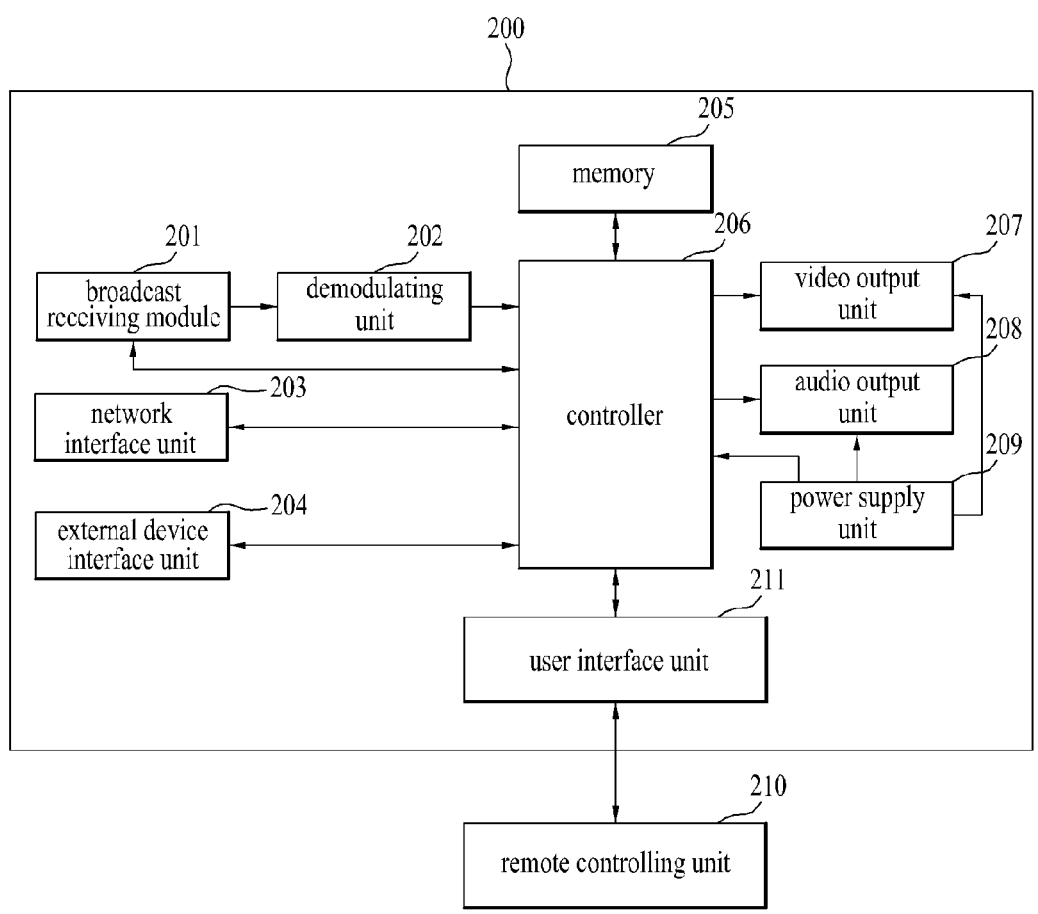
FIG. 2 illustrates a more detailed block view of configuration modules included in the display device according to the exemplary embodiment of the present invention.

FIG. 2 illustrates a more detailed block view of configuration modules included in the display device according to the exemplary embodiment of the present invention. Herein, for example, the display device 200 shown in FIG. 2 corresponds to the display device 110 shown in FIG. 1.

As shown in FIG. 2, the display device 200 according to the exemplary embodiment of the present invention is configured of a broadcast receiving module 201, a demodulator 202, a network interface 203, an external device interface 204, a memory 205, a controller 206, a video output unit 207, an audio output unit 208, a power supply unit 209, and a user interface 211. Meanwhile, the display device 200 may also be designed to perform data communication with a remote controller 210.

The broadcast receiving module 201 may, for example, be designed as an RF tuner, or may be designed as an interface receiving broadcast data from an external device, such as an STB.

The broadcast receiving module 201 may, for example, receive an RF broadcast signal of a single carrier in accordance with an Advanced Television System Committee (ATSC) method or receive an RF broadcast signal of multiple carriers in accordance with a Digital Video Broadcasting (DVB) method.

The demodulator 202 receives a digital IF (DIF) signal, which is converted from the broadcast receiving module 201, and performs demodulating operations on the converted signal.

For example, in case the digital IF signal being outputted from the broadcast receiving module 201 corresponds to an ATSC method, the demodulator 202 performs 8-Verstigal Side Band (8-VSB) demodulation. Additionally, the demodulator 202 may also perform channel decoding.

The external device interface 204 corresponds to an interface enabling data communication to be realized between an external device and the digital device 200. The external device interface 204 may be connected to an external device, such as a Digital Versatile Disk (DVD), a Blu-ray, a gaming device, a camera, a camcorder, a computer (notebook or laptop), an STB, and so on, via wired and/or wireless connection. The external device interface 204 may deliver video, audio, or data signals being inputted from an external source through the external device, which is connected to the external device interface 204, to the controller 206. Additionally, the external device interface 204 may output the video, audio, or data signals, which are processed by the controller 206, back to the external device.

The external device interface 204 may, for example, include a USB terminal, a Composite Video Banking Sync (CVBS) terminal, a component terminal, an S-video terminal (analog), a Digital Visual Interface (DVI) terminal, a High Definition Multimedia Interface (HDMI) terminal, an RGB terminal, a D-SUB terminal, and so on.

The network interface 203 provides an interface for connecting the digital device 200 to an internet network including a wired and/or wireless network. In order to be connected to a wired network, the network interface 203 may, for example, be equipped with an Ethernet terminal. And, in order to be connected to a wireless network, the network interface 203 may, for example, use communication standards, such as Wireless LAN (WLAN or Wi-Fi), Wireless broadband (Wibro), World Interoperability for Microwave Access (Wimax), high Speed Downlink Packet Access (HSDPA), and so on.

The network interface 23 may transmit or receive data to or from another user or another electronic device through the connected (or accessed) network, or through another network, which is linked to the connected (or accessed) network.

The memory 205 may store a program for processing and controlling each signal within the controller 206. And, the memory 205 may also store signal-processed video, audio, or data signals. Additionally, the memory 205 may perform a function of temporarily storing video, audio, or data signals, which are being inputted from the external device interface 204 or the network interface 203. Moreover, the memory 205 also stores diverse OS, middleware, and platforms.

The user interface 211 may deliver a signal being inputted by the user to the controller 206, or may transmit a signal received from the controller 206 to an external device (e.g., the remote controller 210). For example, the user interface 211 may be designed to receive a control signal, which is associated with power on/off, channel selection, screen settings, and so on, from the remote controller 210 in accordance with diverse communication methods, such as a Radio Frequency (RF) communication method, an infrared (IR) communication method, and so on, and to process the received control signal, or the user interface 211 may be designed to transmit a control signal, which is received from the controller 206, to the remote controller 210.

The controller 206 may demultiplex streams being inputted through the broadcast receiving module 201, the demodulator 202, the network interface 203, or the external device interface 204, or may process the demultiplexed signals, so as to generate a signal for video or audio output and to output the generated signal. The controller 206 will be described in more detail later on with reference to FIG. 3.

The video output unit 207 converts each of the video signal, data signal, OSD signal, and so on, which are processed by the controller 206, or converts each of the video signal, data signal, and so on, which are received from the external device interface 204, to R, G, B signals, so as to generate a Drive signal. The video output unit 207 may correspond to any one of a PDP, LCD, OLED, flexible display, 3-dimensional (3D) display, and so on.

The audio output unit 208 receives an audio-processed signal, which are processed by the controller 206, e.g., stereo signal, 3.1 channel signal, or 5.1 channel signal, and outputs the received signal as sound. Herein, the audio output unit 208 may be implemented as diverse forms of speakers.

Additionally, the power supply unit 209 supplies the corresponding power throughout the entire multimedia device (or display device) 200. More specifically, the power supply unit 209 may supply power to the controller 206, which may be implemented in the form of a System On Chip (SOC), and the power supply unit 209 may also supply power to the video output unit 207 for displaying images and to the audio output unit 208 for outputting audio (or sound).

Figure 3:
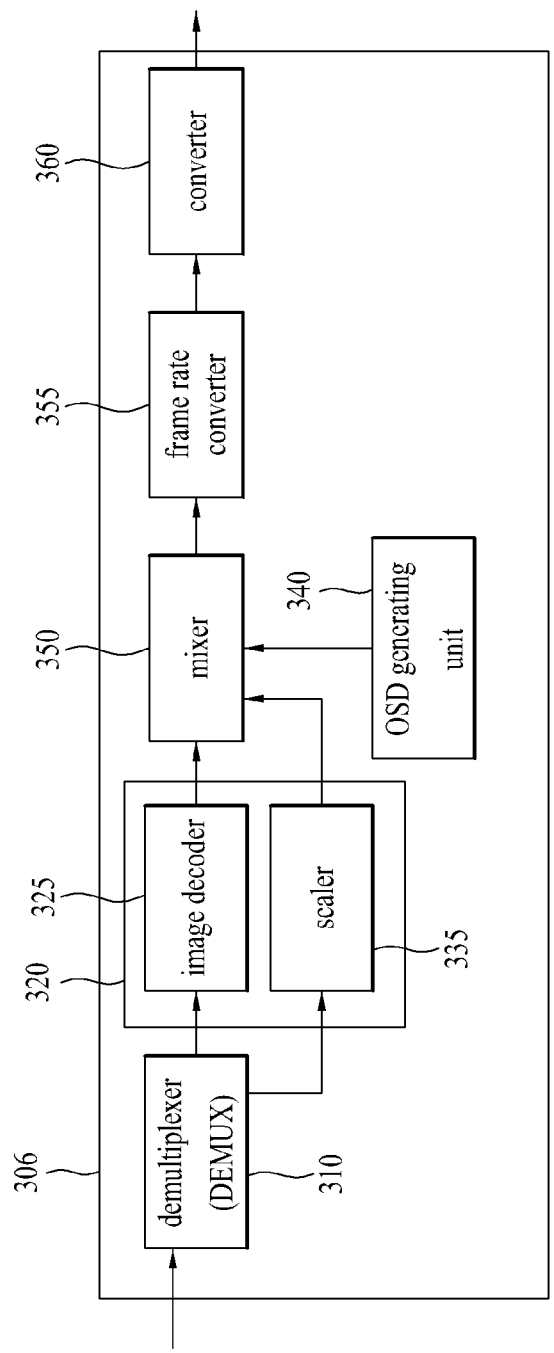
FIG. 3 illustrates elements included in a specific module shown in FIG. 2.

FIG. 3 illustrates elements included in a specific module shown in FIG. 2. Herein, for example, the controller 306 shown in FIG. 3 corresponds to the controller 206 shown in FIG. 2.

As shown in FIG. 3, the controller 306 of the display device includes a demultiplexer (DEMUX) 310, an image processing unit 320, an OSD generating unit 340, a mixer 350, a frame rate converter 355, a formatter 360, and so on. Additionally, the scope of the present invention may also include designing the system, so that the display device can further include a sound processing unit (not shown) and a data processing unit (not shown).

The demutliplexer (DEMUX) 310 demultiplexes an inputted stream. For example, when an MPEG-2 TS is inputted, the demultiplexer 310 demultiplexes the inputted MPEG-2 TS and may split (or divide) the demultiplexed MPEG-2 TS into image (or video), sound (or audio), and data signals.

The image processing unit 320 may perform image processing on the demultiplexed image signal. In order to do so, the image processing unit 320 may be equipped with an image decoder 325 and a scaler 335. The image decoder 325 decodes the demultiplexed image signal, and the scaler 335 performs scaling on the resolution of the decoded image signal, so that the decoded image signal can be outputted by the video output unit. Thereafter, the image signal that is decoded by the image processing unit 320 is inputted to the mixer 350.

The OSD generator 340 generates an OSD signal in accordance with the user's input or by itself. Accordingly, the mixer 350 may mix the OSD signal, which is generated from the OSD generator 340, and the decoded image signal, which is image-processed by the image-processing unit 320.

The mixed signal is provided to the formatter 360. By mixing the decoded broadcast image signal or the externally inputted signal with the OSD signal, the OSD may be displayed by being overlaid on the broadcast image or the externally inputted image.

The frame rate converter (FRC) 355 may convert the frame rate of the image that is being inputted. For example, the FRC 355 may convert the frame rate of 60 Hz to 120 Hz or 240 Hz.

Additionally, the formatter 360 receives an output signal of the frame rate converter (FRC) 355. Thereafter, the formatter 360 may convert the signal format, so that the signal can be adequate for the video output unit, and may then output the converted signal. For example, the formatter 360 may output R, G, and B data signals, and such R, G, and B data signals may be outputted via low voltage differential signaling (LVDS) or mini-LVDS.

Figure 4:
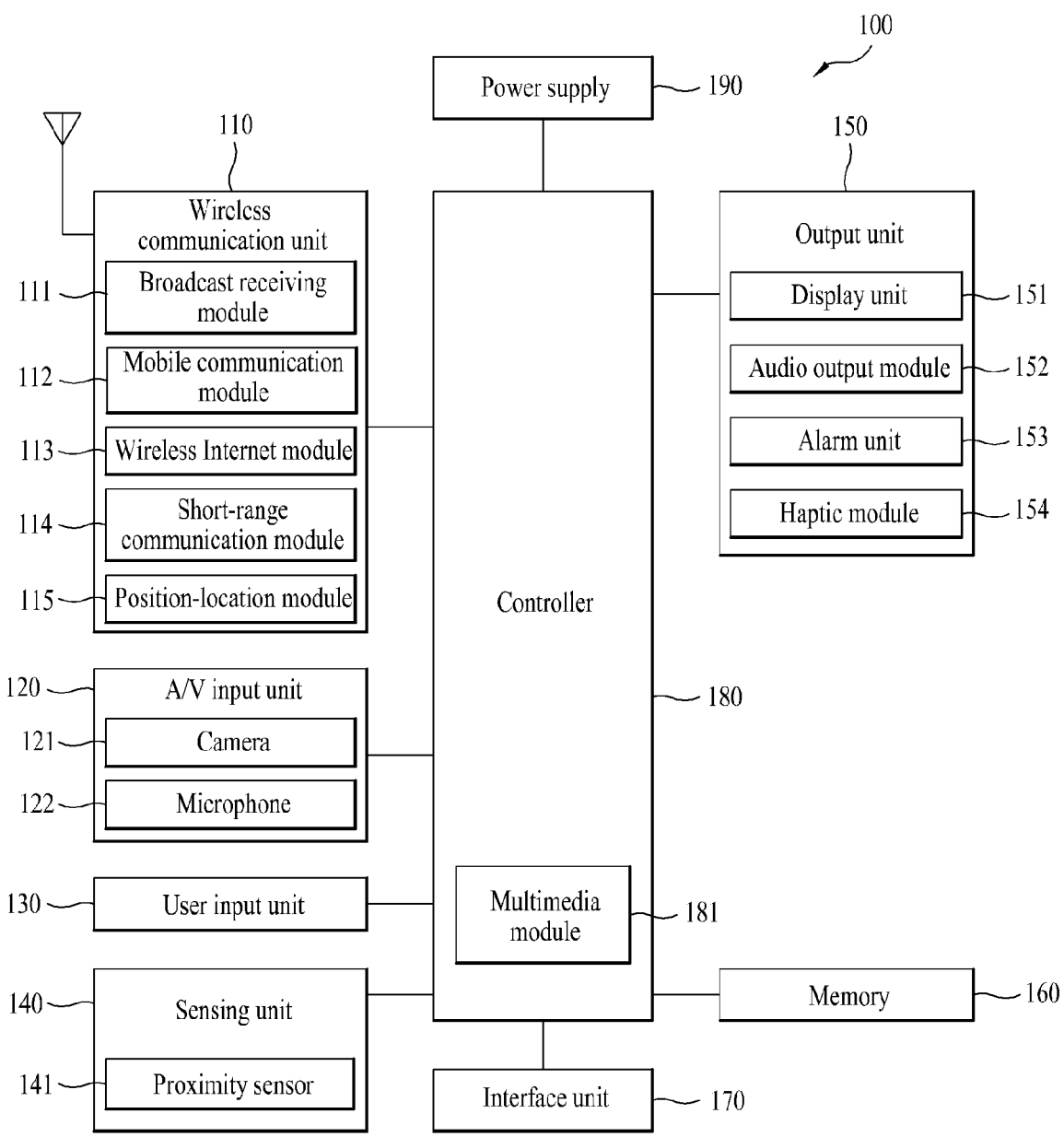
FIG. 4 illustrates a more detailed block view of configuration modules included in the mobile device according to the exemplary embodiment of the present invention.

FIG. 4 illustrates a more detailed block view of configuration modules included in the mobile device according to the exemplary embodiment of the present invention.

The mobile device 100 shown in FIG. 4 may include a wireless communication unit 110, an audio/video (A/V) input unit 120, a user input unit 130, a sensing unit 140, an output unit 150, a memory 160, an interface unit 170, a controller 180, and a power supply unit 190.

Hereinafter, the elements mentioned above will be described in more detail.

The wireless communication unit 110 may include at least one or more modules enabling wireless communication to be realized between the mobile device 100 and a wireless communication system or between the mobile device 100 and a network in which the mobile device 100 is located. For example, the wireless communication unit 110 may include a broadcast receiving module 111, a mobile communication module 112, a wireless internet module 113, a short range communication module 114, and a position information module 115.

The broadcast receiving module 111 receives a broadcast signal and/or information related to broadcasting from an external broadcast management service through a broadcast channel.

The broadcast channel may include a satellite channel and a groundwave (or terrestrial) channel. The broadcast management server may refer to a server generating and transmitting the broadcast signal and/or information related to broadcasting or may refer to a server receiving an already-generated broadcast signal and/or information related to broadcasting and transmitting the received broadcast signal and/or information related to broadcasting to a user equipment. The broadcast signal may include a TV broadcast signal, a radio broadcast signal, and a data broadcast signal, and the broadcast signal may also include a broadcast signal consisting of a TV broadcast signal or a radio broadcast signal being combined with a data broadcast signal.

The information related to broadcasting may refer to information related to a broadcast channel, a broadcast program, or a broadcast service provider. The information related to broadcasting may be provided through a mobile communication network. In such case, the information related to broadcasting may be received by the mobile communication module 112.

The information related to broadcasting may exist is diverse formats. For example, the information related to broadcasting may exist in the form of an Electronic Program Guide (EPG) of Digital Multimedia Broadcasting (DMB) or in the form of an Electronic Service Guide (ESG) of Digital Video Broadcast-Handheld (DVB-H).

The broadcast receiving module 111 may receive a digital broadcast signal by using a digital broadcasting system, such as a Digital Multimedia Broadcasting-Terrestrial (DMB-T) system, a Digital Multimedia Broadcasting-Satellite (DMB-S) system, a Media Forward Link Only (MediaFLO) system, a Digital Video Broadcast-Handheld (DVB-H) system, an Integrated Services Digital Broadcast-Terrestrial (ISDB-T) system, and so on. Evidently, the broadcast receiving module 111 may be configured to be adequate not only for the above-described digital broadcasting systems but also for other broadcasting systems.

The broadcast signal and/or information related to broadcasting may be stored in the memory 160 through the broadcast receiving module 111.

The mobile communication device 112 transmits and receives (or transceives) wireless signals to and from at least any one of a base station, external user equipment, and server within a mobile communication network.

The wireless Internet module 113 refers to a module for performing wireless internet access, and the wireless internet module 113 may be embedded in the mobile device 100 or may be externally equipped to the mobile device 100. Herein, Wireless LAN (WLAN or Wi-Fi), Wireless broadband (Wibro), World Interoperability for Microwave Access (Wimax), high Speed Downlink Packet Access (HSDPA), and so on, may be used as the wireless internet technology.

The short range communication module 114 refers to a module for performing short range (or close range) communication. Herein, Bluetooth, Radio Frequency Identification (RFID), Infrared Data Association (IrDA), Ultra Wideband (UWB), ZigBee, and so on, may be used as the short range communication technology.

The position information module 115 corresponds to a module configured to acquire information on the position of the mobile device. A typical example of the position information module 115 may correspond to a Global Position System (GPS) module.

The audio/video (A/V) input unit 120 corresponds to an element for inputting audio signals or video signals. Herein, examples of the A/V input unit 120 may include a camera 121, a microphone 122, and so on. The camera 121 processes an image frame (or video frame), such as a still image or a moving picture image, which is acquired from an image sensor in a videophone mode or a recording mode. The processed video frame may be displayed on a display unit 151.

The video frame, which is processed by the camera 121, may be stored in the memory 160 or may be transmitted to an external device through the wireless communication unit 110. Depending upon the usage environment, the A/V input unit 120 may be equipped with at least 2 or more cameras 121.

The microphone 122 receives an external sound signal in a call connection mode, voice-recording mode, or voice recognition mode, and, then, the microphone 122 processes the received signal as electrical sound (or audio) data. In case the microphone 122 is in the call connection mode, the processed sound data may be converted to a format, which can be transmitted to a mobile communication base station through the mobile communication module 112, thereby being outputted. Diverse noise removing algorithms may be implemented in the microphone 122 in order to remove (or eliminate) noise that may occur during the process of receiving an external sound signal.

The user input unit 130 generates input data enabling the user to control the operations of the user equipment (or user device). Herein, the user input unit 130 may be configured in the form of a key pad, a dome switch, a touch pad (static pressure type/capacitive), a jog wheel, a jog switch, and so on.

The sensing unit 140 senses the current state of the mobile device 100, such as an open and/or closed state of the mobile device 100, the position of the mobile device 100, the presence or absence of a user access, bearings of the mobile device, acceleration and/or deceleration of the mobile device, and so on, and then generates a sensing signal for controlling the operations of the mobile device 100. For example, in case the mobile device 100 is a slider phone, the sensing unit 140 may sense whether the mobile device 100 (or mobile phone) is open or closed. Additionally, the sensing unit 140 may also sense whether or not power is being supplied from the power supply unit 190, whether or not an external device is combined with the interface unit 170. Meanwhile, the sensing unit 140 may include a short range sensor 141.

The output unit 150 may correspond to a unit for generating output related to the visual sense, the auditory sense, the tactile sense (or haptic sense), and so on. Accordingly, the output unit 150 may include a display unit 151, a sound output module 152, an alarm unit 153, and a haptic module 154.

The display unit 151 displays (outputs) information being processed by the mobile device 100. For example, when the mobile device 100 is in the call-connection mode, the display unit 151 may display a User Interface (UI) or a Graphic User Interface (GUI) that is related to the connected call. When the mobile device 100 is in the video phone mode or recording mode, the display device may display the recorded and/or received image, a UI, or a GUI.

The display unit 151 may include at least any one of a liquid crystal display (LCD), a thin film transistor-liquid crystal display (TFT-LCD), an organic light-emitting diode (OLED), a flexible display, and a 3D display.

Among the diverse types of displays listed above, some of the displays may be configured as transparent displays or light-transmitting displays, through which the external environment can be seen. This may be referred to as transparent displays. Herein, a Transparent OLED (TOLED) may corresponds to a typical example of the transparent display. A rear end structure of the display unit 151 may also be configured to have a light-transmitting structure. In accordance with such structure, the user may be capable of viewing the objects that are located behind the body of the mobile device (or mobile device body) through the area, which is occupied by the mobile device body.

Depending upon the implemented structure of the mobile device 100, two or more display units 150 may exist in the mobile device 100. For example, multiple display units may be positioned to be spaced apart from one another on a single surface or may be positioned as a single body. Alternatively, each of the multiple display units may also be positioned on different surfaces.

When the display unit 151 and a sensor sensing a touch motion (hereinafter referred to as a 'touch sensor') for an inter-layered structure (hereinafter referred to as a 'touch screen'), in addition to being used as an output device, the display unit 151 may also be used as an input device. The touch sensor may be configured as a touch film, a touch sheet, a touch pad, and so on.

The touch sensor may be configured to convert a change in a pressure level being applied to a specific area of the display unit 151, or a change in the capacitance occurring on a specific area of the display unit 151, and so on, to an electrical input signal. The touch sensor may be configured to detect not only the position or surface area of the display unit that is being touched but also the pressure level being applied to the display unit during the touch motion.

When a touch input respective to the touch sensor exists, the respective signal(s) is (are) delivered to a touch controller. After processing the signal(s), the touch controller transmits the respective data to the controller 180. Thus, the controller 180 may be capable of knowing (or recognizing) which are of the display unit 151 is being touched.

A short range sensor 141 may be positioned in the internal area of the mobile device, which is covered (or enveloped by the touch screen, or may be positioned within a short range of the touch screen. The short range sensor 141 refers to a sensor that can detect an object approaching a predetermined detecting surface of the corresponding sensor or that can detect the presence or absence of an object existing within a close proximity of the corresponding sensor, by using the intensity of an electromagnetic field or infrared light rays without using any mechanical touch. Herein, the short range sensor has a longer durability and a wider range of application (or usage) as compared to a touch-type sensor.

Examples of the short range sensor may include a transmission photosensor, a direct reflection photosensor, a mirror reflection photosensor, a high-frequency oscillation-type proximity sensor, a capacitance proximity sensor, a magnetic-type proximity sensor, an infrared proximity sensor, and so on. When the touch screen is configured as an electrical static type touch screen, the approach of the pointer may be detected by a change in the electrical field respective to the short range approach of the pointer. In this case, the touch screen (touch sensor) may be categorized as a proximity sensor.

Hereinafter, for simplicity in the description of the present invention, an action having the sensor unit sense (or recognize) a proximate (or short range) positioning of a pointer to the touch screen without having the pointer actually touch the touch screen will be referred to as a "proximity touch", and an action having the pointer actually touch the touch screen will be referred to as a "contact touch". A position corresponding to the proximate touch of the pointer on the touch screen refers to a perpendicular position of the pointer respective to the touch screen, when the pointer proximately touches the touch screen.

The short range sensor senses a proximate touch and a proximate touch pattern (e.g., a proximate touch distance, a proximate touch direction, a proximate touch speed, a proximate touch time, a proximate touch position, movement status of a proximate touch, and so on). The information corresponding to the sensed proximate touch and proximate touch pattern may be outputted to the touch screen.

The sound output module 152 may output audio data, which are received from the wireless communication unit 110 during a call signal reception, or in a call-connection mode or a voice-recording mode, a voice recognition mode, a broadcast receiving mode, and so on, or which are stored in the memory 160. The sound output module 152 may also output a sound signal related to a function (e.g., a call signal reception tone, a message reception tone, and so on) performed by the mobile device 100. Such sound output module 152 may include a receiver, a speaker, a buzzer, and so on.

The alarm unit 153 outputs a signal for notifying the occurrence of an event in the mobile device 100. Examples of the events occurring in the mobile device 100 may include the reception of an incoming call signal, the reception of a message, the input of a key signal, the input of a touch, and so on. In addition to the forms of a video signal or an audio signal, the alarm unit 153 may also output, for example, a signal for notifying the occurrence of an event via vibration. Since the video signal or the audio signal may also be outputted through the display unit 151 or the sound output module 152, the display unit 151 or the sound output module 152 may be categorized as a part of the alarm unit 153.

The haptic module 154 generates diverse sensory effects that may be felt (or sensed) by the user. Herein, vibration may correspond to a typical example of the sensory effects being generated by the haptic module 154. The haptic module 154 may control the intensity and pattern of the generated vibration. For example, the haptic module 154 may output a combination of different vibrations or may sequentially output a series of different vibrations.

In addition to vibration, the haptic module 154 may generate diverse haptic effects, such as effects caused by a variety of stimulation, such as effects caused by an alignment of pins performing movements perpendicular to the contacting surface of the user's skin, air projection force or air suction force through a projection hole or a suction hole, flicker movement (or touch) on the surface of the user's skin, contact of electrodes, electrostatic force, effects caused by the realization of heat or coldness using a device that can absorb heat or generate heat, and so on.

The haptic module 154 may deliver haptic effects (or tactile or sensory effects) to the user via direct haptic (or tactile) contact. Moreover, the haptic module 154 may also be implemented so as to be capable of sensing the haptic effects through the muscular sensation (or kinesthetic sensation) of the user, such as the user's fingers or arm. Depending upon the configuration of the mobile device 100, two or more haptic modules 154 may be provided.

The memory 160 may store a program for the operations of the controller 180 and may temporarily store the data (e.g., phone book, message, still image, moving picture image, and so on). The memory 160 may store data related to diverse vibration patterns and sound, which are being outputted when a touch is inputted on the touch screen.

The memory 160 may include at least one type of storage means, such as a flash memory type, a hard disk type, a multimedia card micro type, a card-type memory (e.g., SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, and an optical disk. The mobile device 100 may operate in relation with a web storage, which performs the same storage function as the memory 160 over the internet.

The interface unit 170 performs the function of a path between the mobile device 100 and all external devices being connected to the mobile device 100. The interface unit 170 may receive data from the external devices, or may be supplied with power so as to deliver the supplied power to each element configuring the mobile device 100, or may transmit data within the mobile device 100 to the external devices. For example, a wired/wireless headset port, an external recharger port, a wired/wireless data port, a memory card port, an port for connecting a device being equipped within an identification module, an audio input/output (I/O) port, a video input/output (I/O) port, an earphone port, and so on may be included in the interface unit 170.

An identification module corresponds to a chip storing diverse information for certifying usage authority of the mobile device 100. Herein, the identification module may include a User Identity Module (UIM), a Subscriber Identity Module (SIM), a Universal Subscriber Identity Module (USIM), and so on. The device being equipped with an identification module may be produced in the form of a smart card. Accordingly, the identification device may be connected to the mobile device 100 through a port.

The interface unit may perform the function of a path through which power being supplied from external cradles is supplied to the mobile device 100, when the mobile device 100 is connected to external cradles, and the interface unit may also perform the function of a path through which diverse command signals being inputted from the cradles are delivered to the mobile device 100. The diverse command signals or the power being inputted from the cradles may operate as signals for recognizing that the mobile device has been accurately mounted to (or connected to) the external cradles.

The controller 180 generally controls the overall operations of the mobile device. For example, the controller 180 performs control and processing functions associated with voice call connection, data communication, videophone call connection, and so on. The controller 180 may also be equipped with a multimedia module 181 for multimedia playback. The multimedia module 181 may be implemented within the controller 180 or may be separately implemented from the controller 180.

The controller 180 may perform pattern recognition processing operations for recognizing writing input or drawing input performed on the touch screen and respectively processing the recognized inputs in the form of text and image.

The power supply unit 190 receives external power and internal power in accordance with the control of the controller 180 and, then, supplies the power required for the operations of each element.

The various embodiments of the present invention being described in the description set forth herein may be implemented in a recording medium that can be read by a computer or a similar device by using, for example, software, hardware, or a combination of software and hardware.

In case of implementing the embodiments of the present invention in the form of hardware, the embodiment of the present invention may be implemented by using at least one of ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, and electrical units performing other functions. In some cases, the embodiments described in the description of the present invention may be implemented by the controller 180 itself.

In case of implementing the embodiments of the present invention in the form of software, the embodiments of the present invention corresponding to the procedures and functions described in the description of the present invention may be implemented as separate software modules. Herein, each of the software modules may perform at least one of the functions and operations described in the description of the present invention. A software code may be implemented by using a software application, which is written in an adequate programming language. The software code may be stored in the memory 160 and may be executed by the controller 180.

Figure 5:
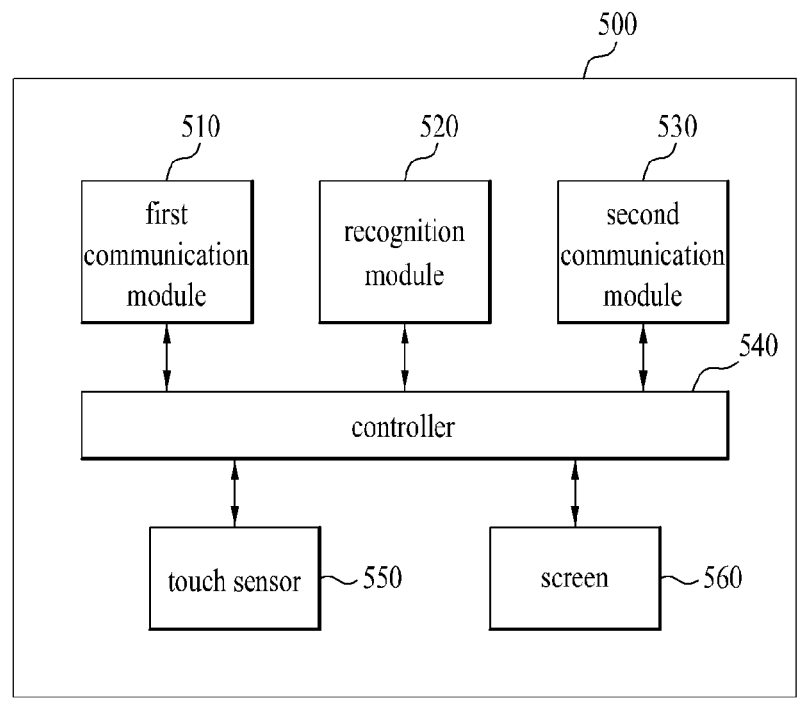
FIG. 5 illustrates a more detailed block view of configuration modules included in the mobile device according to another exemplary embodiment of the present invention.

FIG. 5 illustrates a more detailed block view of configuration modules included in the mobile device according to another exemplary embodiment of the present invention. The scope of the present invention may include providing supplemental description of FIG. 5 by referring to the modules described above in FIG. 4.

The mobile device 500 shown in FIG. 5 is designed to be capable of performing communication with the electronic tag and the display device shown in FIG. 1.

First of all, when a first communication module 510 is located within a predetermined range from the electronic tag, the first communication module 510 may receive the data stored in the electronic tag from the electronic tag.

A recognition module 520 recognizes pairing information included in the data, and a second communication module 530 may perform wireless connection with the display device, which is identified by the pairing information. Herein, for example, the pairing information includes at least one or more set-up values required to establish wireless communication connection between the mobile device and the display device.

A screen 560 displays at least two or more options for selecting the device respective to the contents that are to be outputted. A touch sensor 550 is designed to sense (or detect) at least one or more of the touched position or direction within the screen 560.

When a first option is sensed by the touch sensor 550, the controller 540 controls the second communication module 530, so that the contents that are currently being outputted can be transmitted to the display device. Furthermore, when a second option is sensed by the touch sensor 550, the controller 540 controls the second communication module 530, so that the display device can receive the contents that are currently being outputted.

In case the pairing information is not included in the data, the screen 560 according to another embodiment of the present invention may output data listing at least one or more devices that are available for wireless communication connection. The touch sensor 550 according to the other embodiment of the present invention receives a command selecting a specific display device among the listed devices. Also, when the command is received, the controller 540 is controls the first communication module 510, so that the pairing information for performing wireless communication connection between the specific display device and the mobile device can be transmitted to the electronic tag, and, then, the controller 540 deletes the pairing information stored in the memory (not shown).

Additionally, according to yet another embodiment of the present invention, when an upward direction is sensed by the touch sensor 550, it may be considered that the first option has been selected, and, when a downward direction is sensed by the touch sensor 550, it may be considered that the second option has been selected. This will be described in more detail later on with reference to FIG. 16 and FIG. 17.

Figure 6:
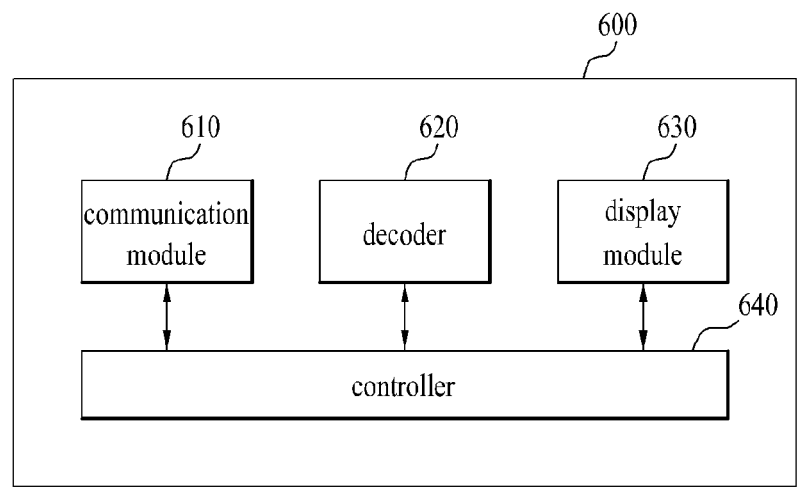
FIG. 6 illustrates a more detailed block view of configuration modules included in the display device according to another exemplary embodiment of the present invention.

FIG. 6 illustrates a more detailed block view of configuration modules included in the display device according to another exemplary embodiment of the present invention. The scope of the present invention may include providing supplemental description of FIG. 6 by referring to the modules described above in FIG. 2 and FIG. 3.

The mobile device 600 shown in FIG. 6 is designed to be capable of performing communication with the mobile device shown in FIG. 1.

First of all, the display module 630 shown in FIG. 6 outputs video data of a first content, and the communication module 610 uses pairing information pre-stored in the memory of the mobile device, so as to perform wireless communication with the mobile device.

When a first command is received from the mobile device by using the communication module 610, the decoder 620 decodes a second content that is currently being outputted by the mobile device.

Additionally, when a second command is received from the mobile device by using the communication module 610, the controller 640 interrupts the decoding of the video data included in the first content. Thereafter, the controller 640 may control the display module 600, so that the second content can be outputted through the display module 630 instead of the first content.

The pairing information may be temporarily stored in the memory of the mobile device from an electronic tag. The display device 600 corresponds to a television receiver or a tablet PC, which is connected to a wireless communication network.

Furthermore, according to the other embodiment of the present invention, the first command corresponds to a command signal ordering the second content to be transmitted to the display device from the mobile device. And, according to yet another embodiment of the present invention, the second command corresponds to a command signal ordering the second content to be outputted from the display module instead of the first content.

Figure 7:
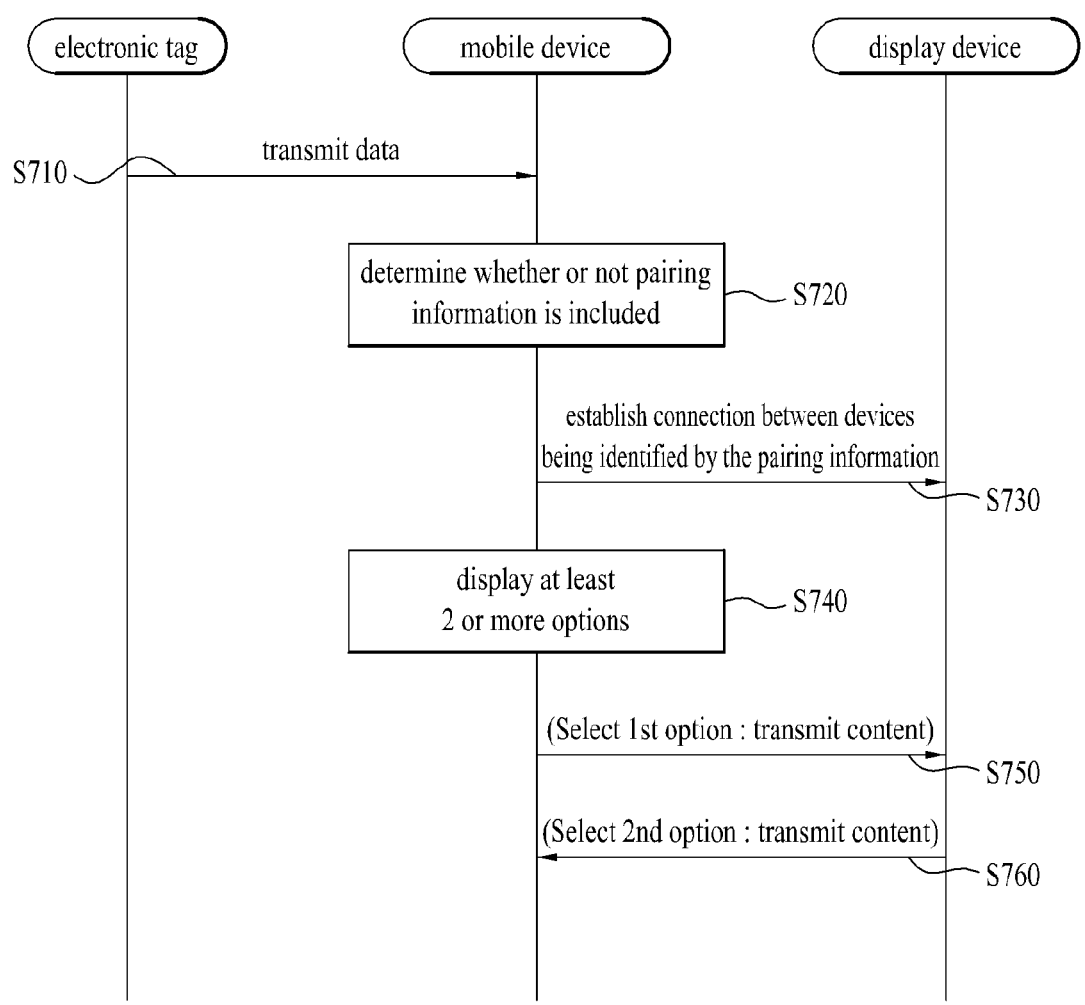
FIG. 7 illustrates a flow chart showing the process steps of a method for controlling a system including an electronic tag, a mobile device, and a display device according to an exemplary embodiment of the present invention.

FIG. 7 illustrates a flow chart showing the process steps of a method for controlling a system including an electronic tag, a mobile device, and a display device according to an exemplary embodiment of the present invention.

When a mobile device is positioned within a predetermined range from an electronic tag, data stored in the electronic tag are transmitted to the mobile device from the electronic tag (S710).

The mobile device determines whether or not pairing information is included in the data (S720). And, when the pairing information is included the data, a wireless communication connection is performed between a display device, which is identified by the pairing information, and the mobile device (S730).

The mobile device displays at least 2 or more options for selecting a device respective to a content that is to be outputted (S740).

When a first option is selected, the content that is currently outputted by the mobile device is transmitted to the display device (S750).

And, when a second option is selected, the content that is currently outputted by the display device is transmitted to the mobile device (S760). Evidently, before performing the process step S760, a request signal requesting the corresponding content may be transmitted from the mobile device to the display device.

For example, the predetermined range may correspond to a distance range that can be recognized by a Near Field Communication (NFC) sensor or a Radio Frequency Identification (RFID) sensor, which is equipped to the mobile device and the electronic tag.

For example, the pairing information includes at least one or more set-up values required for the wireless communication connection between the mobile device and the display device. Accordingly, this may be technically advantageous in that a complex process for performing communication connection between the mobile device and the display device can be omitted.

When the pairing information is not included in the data, the mobile device outputs data listing at least one or more devices being available for wireless communication connection. And, then, the mobile device receives a command for selecting a specific display device among the listed devices. Furthermore, when the command is received, pairing information for the wireless communication connection between the specific display device and the mobile device is transmitted to the electronic tag, and the pairing information that is stored in the memory of the mobile device is deleted. Accordingly, by not storing the pairing information in the mobile device, the efficiency in the memory may be enhanced.

According to another embodiment of the present invention, the process step S730 may further include a step of determining whether or not the same Access Point (AP) is being used by the mobile device and the display device, and, if the same AP is not used by the mobile device and the display device, a step of having the display device display a message guiding wireless communication connection. Herein, step S730 corresponds to a Wi-fi direct connection.

Furthermore, according to yet another embodiment of the present invention, when the first option is selected (step S750 of FIG. 7), the method for controlling the system may further include a step of determining an attribute of the content that is currently being outputted by the mobile device, and a step of transmitting the content from the mobile device to the display device by using another transmission method. Additionally, when the second option is selected (step S760 of FIG. 7), the method for controlling the system may further include a step of determining whether or not an application enabling the transmission to be performed is stored in the memory, and, if the application is not stored in the memory, displaying a message guiding a download path of the application. This will hereinafter be described in more detail with reference to FIG. 8.

Figure 8:
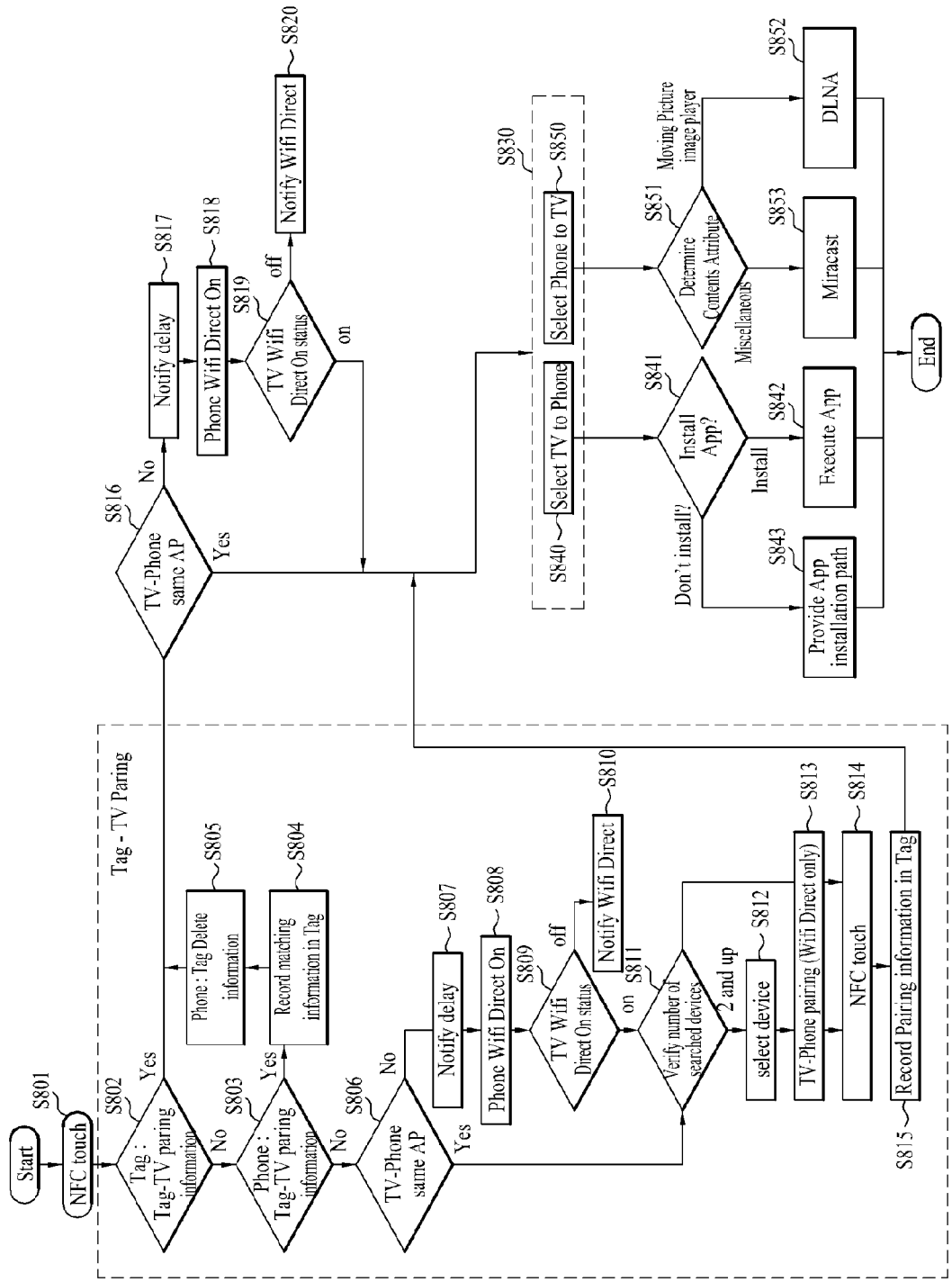
FIG. 8 illustrates a flow chart showing the process steps of a method for controlling a system including an electronic tag, a mobile device, and a display device according to another exemplary embodiment of the present invention.

FIG. 8 illustrates a flow chart showing the process steps of a method for controlling a system including an electronic tag, a mobile device, and a display device according to another exemplary embodiment of the present invention. The scope of the present invention may include realizing another embodiment of the present invention by referring to FIG. 8. Accordingly, anyone skilled in the art may be capable of supplementing the descriptions provided in FIG. 7 and FIG. 8.

According to the other embodiment of the present invention, when an electronic tag and a mobile device are touched by an NFC touch (S801), it is determined whether or not pairing information exists in the electronic tag (S802). The pairing information includes setting information for performing communication connection between the mobile device and the display device.

When the pairing information exists in the electronic tag, it is determined whether the same Access Point (AP) is being used by the mobile device (e.g., phone) and the display device (e.g., TV) (S816).

Based upon the determined result (S816), when it is determined that the same AP is being used, the mobile device displays a guidance message for deciding a device through which a content is being outputted (S830).

When an option transmitting the content being outputted from the display device to the mobile device is selected (S840), the mobile device may determine whether or not an associated application is stored in the memory (S841). Then, based upon the determined result (S841), if the corresponding application is already installed, the associated application is executed (S842). Conversely, based upon the determined result (S841), if the corresponding application is not installed, path information enabling the associated application to be downloaded is displayed (S843).

When an option transmitting the content being outputted from the mobile device to the display device is selected (S850), an attribute (type) of the content that is currently being outputted is determined (S851). Based upon the determined result (S851), when a moving picture image is being executed, the content may be transmitted by using a DLNA transmission method. Conversely, when a content type other than the moving picture image type is being executed, the corresponding content may be transmitted by using a Miracast method.

Meanwhile, based upon the determined result (S816), when the same AP is not being used, the mobile device may output a delay message delaying the communication connection (S817), and the mobile device may switch the connection status of the Wi-fi direct connection of the mobile device to an ON state (S818).

The mobile device determines the Wi-fi direct status of the display device (S819), and, in case the connection is not continually made (i.e., when the connection is interrupted), the mobile device displays a guidance message (S820). The guidance message corresponds to a description being provided to guide the user to switch the Wi-fi direct connection status to an ON state. Evidently, the Wi-fi direct is merely exemplary. And, therefore, other communication connection methods may be used in the present invention.

Conversely, when pairing information does not exist in the electronic tag, the mobile device (e.g., phone) determines whether or not pairing information for performing communication connection between the mobile device and the specific display device is stored therein (S803). Then, based upon the determined result (S803), if the pairing information is stored in the mobile device, the pairing information is recorded in the electronic tag (S804), and the pairing information, which is stored in the mobile device, is automatically deleted (S805). Thus, the efficiency in the memory of the mobile device may be enhanced. It will also be apparent that step S805 can be omitted so as to implement another embodiment of the present invention.

Based upon the determined result (S803), if the pairing information does not exist, it is determined whether or not the same AP is being used by the mobile device and the display device (S806). More specifically, if a communication connection is not made, a solution for resolving such problem will hereinafter be described in detail.

Based upon the determined result (S806), if the same AP is not being used, the mobile device may output a delay message delaying the communication connection (S807), and the mobile device may switch the connection status of the Wi-fi direct connection of the mobile device to an ON state (S808).

The mobile device determines the Wi-fi direct status of the display device (S809), and, in case the connection is not continually made (i.e., when the connection is interrupted), the mobile device displays a guidance message (S810). The guidance message corresponds to a description being provided to guide the user to switch the Wi-fi direct connection status to an ON state. Evidently, the Wi-fi direct is merely exemplary. And, therefore, other communication connection methods may be used in the present invention.

Furthermore, when the communication connection between the mobile device and the display device is realized after performing step S806 or step S809, the mobile device determines the number of display devices being connected with the mobile device via communication (S811).

Based upon the determined result (S811), when multiple display devices are connected to the mobile device via communication, the mobile device specifies a display device in order to perform pairing (S812). When the mobile device and the specific display device are connected via communication (S813), the mobile device is touched by the electronic tag (S814). Evidently, herein, the term touch refers to a case when the mobile device and the electronic tag are positioned to a spaced apart from one another at a predetermined distance enabling an NFC sensor to transmit and receive data to and from the mobile device and the electronic tag. Furthermore, the pairing information, which is recognized (or identified) by the mobile device, is transmitted to the electronic tag, and the electronic tag stores the pairing information (S815).

Accordingly, when designing the system as shown in FIG. 8, it may be advantageous in that the user is not required to manually attempt to perform communication connection each time he (or she) wishes, and that the data recorded in the electronic tag may simply be used.

Figure 9:
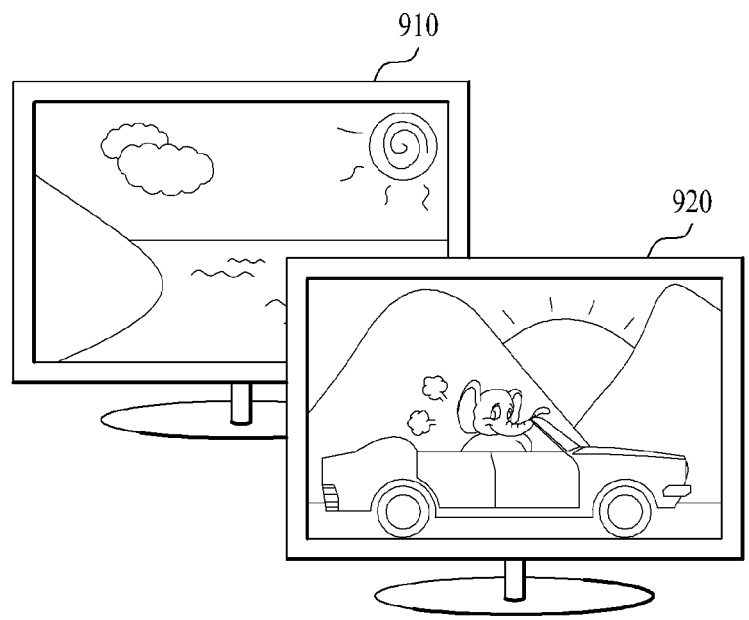
FIG. 9 illustrates an exemplary case when the mobile device and the electronic tag are being touched according to the exemplary embodiment of the present invention.
Figure 9:
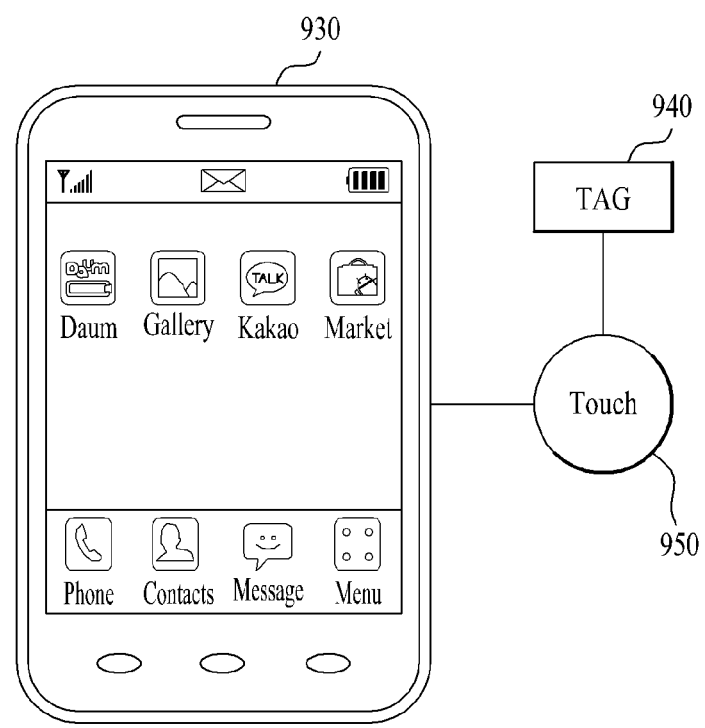

FIG. 9 illustrates an exemplary case when the mobile device and the electronic tag are being touched according to the exemplary embodiment of the present invention.

As shown in FIG. 9, a first display device 910 and a second display device 920, and a mobile device 930 each outputs a different content. At this point, it will be assumed that the mobile device 930 is touched 950 to an electronic tag 940. As described above, the touch 950 may include an actual touch and may also include a case when two devices are positioned within a range detectable by an NFC/RFID sensor.

Figure 10:
FIG. 10 illustrates a guidance message being outputted from the mobile device, when power of the display device that is to be connected to the mobile device according to the exemplary embodiment of the present invention is turned off.

FIG. 10 illustrates a guidance message being outputted from the mobile device, when power of the display device that is to be connected to the mobile device according to the exemplary embodiment of the present invention is turned off. Hereinafter, FIG. 10 will be described under the same assumption made with reference to FIG. 9.

When a display device, which is connected to the mobile device according to the embodiment of the present invention via communication, does not exist, the mobile device displays a guidance message directing the user to change the power status of the display device from ON to OFF, as shown in FIG. 10. Evidently, the scope of the present invention also includes outputting an additional guidance message directing the user to also change (or switch) the communication status of the display device from OFF to ON.

Figure 11:
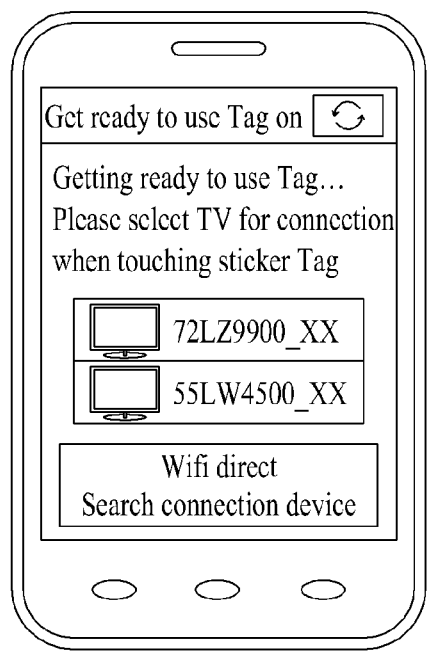
FIG. 11 illustrates an exemplary case when a plurality display device request connection with the mobile device according to the exemplary embodiment of the present invention.

FIG. 11 illustrates an exemplary case when a plurality of display devices request connection with the mobile device according to the exemplary embodiment of the present invention.

As shown in FIG. 9, when multiple display devices available for communication connection with the mobile device exist, the mobile device displays a list identifying display devices that are available for connection with the mobile device, as shown in FIG. 11. When a specific display device is selected, the system is designed so that the related pairing information is automatically recorded in the electronic tag.

Figure 12:
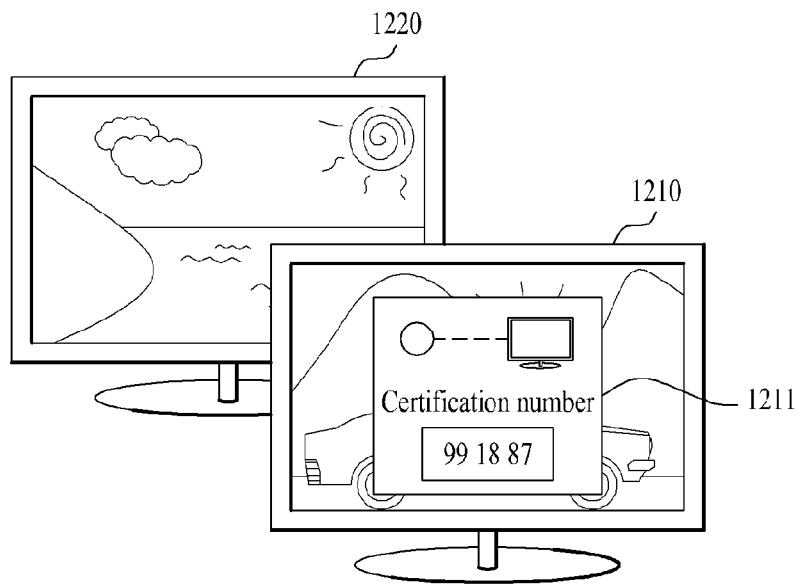
FIG. 12 illustrates an exemplary process of inputting a certification number in order to connect the mobile device to a specific display device according to the exemplary embodiment of the present invention.
Figure 12:
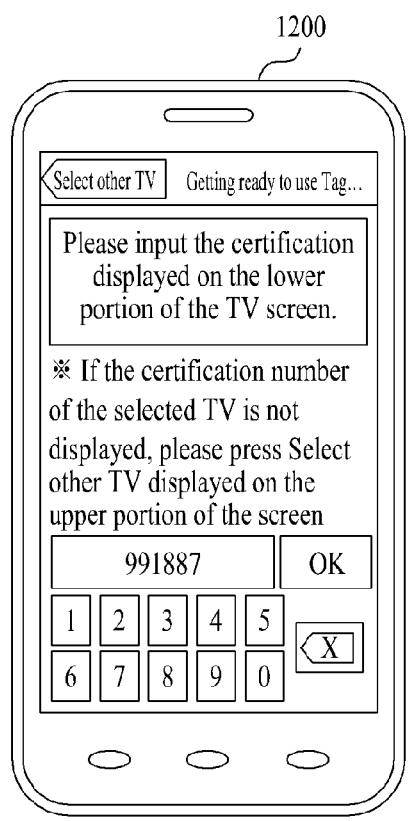

FIG. 12 illustrates an exemplary process of inputting a certification number in order to connect the mobile device to a specific display device according to the exemplary embodiment of the present invention.

When a specific display device is selected in FIG. 11, as shown in FIG. 12, the selected specific display device 1210 outputs a certification number message 1211 for establishing connection between the two devices. Evidently, at this point, no change occurs on the screen of the remaining display devices 1220. Accordingly, the mobile device 1200, which is connected to the specific display device 1210 via communication, may generate and display a window through which the certification number can be inputted.

Figure 13:
FIG. 13 illustrates an exemplary case when the mobile device according to the exemplary embodiment of the present invention outputs data, when the certification number shown in FIG. 12 does not match.

FIG. 13 illustrates an exemplary case when the mobile device according to the exemplary embodiment of the present invention outputs data, when the certification number shown in FIG. 12 does not match.

As described above in FIG. 12, the mobile device may input the certification number, which is displayed by the specific display device. However, when the user fails to correctly input the certification number, which is outputted from the specific display device, to the mobile device by mistake, a guidance message notifying the user to input the certification once again is displayed, as shown in FIG. 13.

Figure 14:
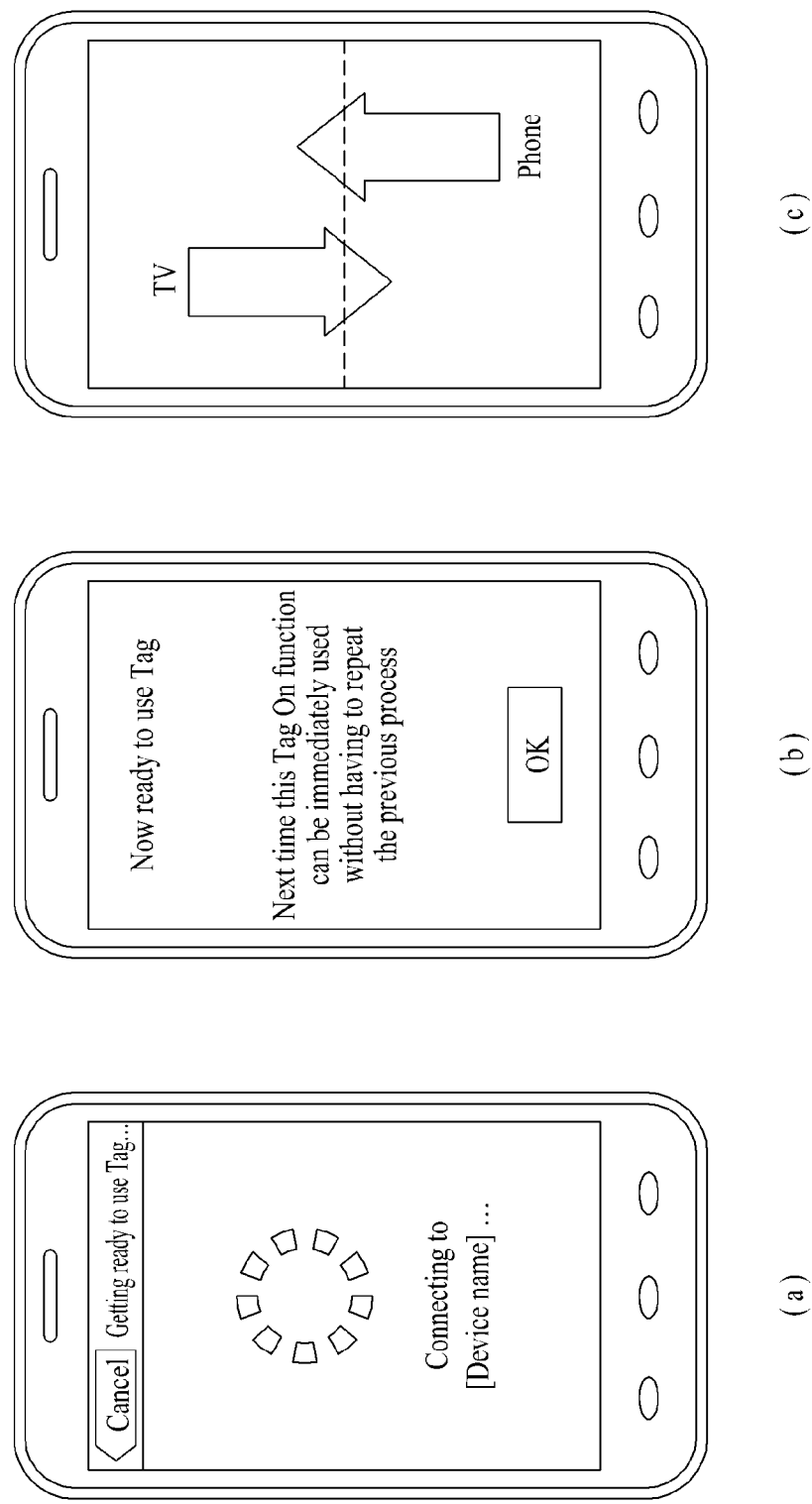
FIG. 14 illustrates an exemplary case when the mobile device according to the exemplary embodiment of the present invention outputs data, when the certification number shown in FIG. 12 matches.

FIG. 14 illustrates an exemplary case when the mobile device according to the exemplary embodiment of the present invention outputs data, when the certification number shown in FIG. 12 matches.

As described above in FIG. 12, the mobile device may correctly input the certification number, which is displayed by the specific display device. At this point, first of all, as shown in (a) of FIG. 14, the mobile device may output a guidance message notifying a preparation procedure in order to share contents with the specific display device.

Furthermore, when the preparation procedure is completed, the mobile device displays a guidance message indicating that the certification number inputting procedure is no longer required, as shown in (b) of FIG. 14. Additionally, pairing information for establishing communication connection between the mobile device and the specific display device is stored in the electronic tag.

And, as shown in (c) of FIG. 14, the mobile device displays a Graphical User Interface (GUI) may decide the transmission direction of the content, which the mobile device wishes to share with the specific display device.

Figure 15:
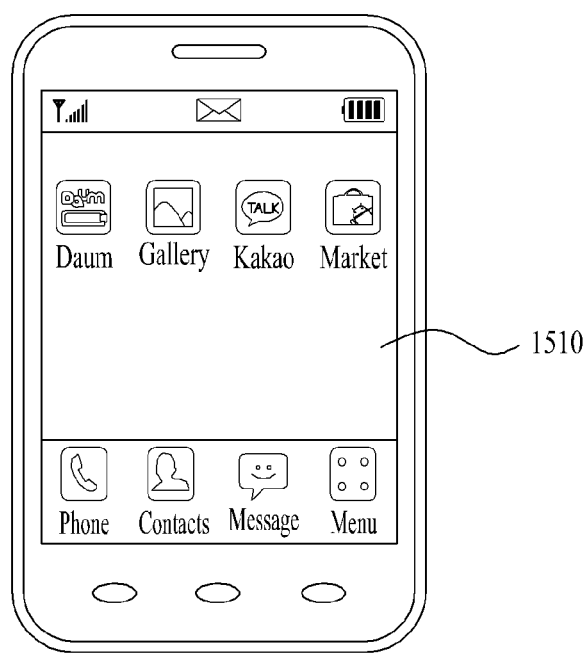
FIG. 15 illustrates an exemplary case when the above-described certification number inputting procedure is omitted according to another exemplary embodiment of the present invention.
Figure 15:
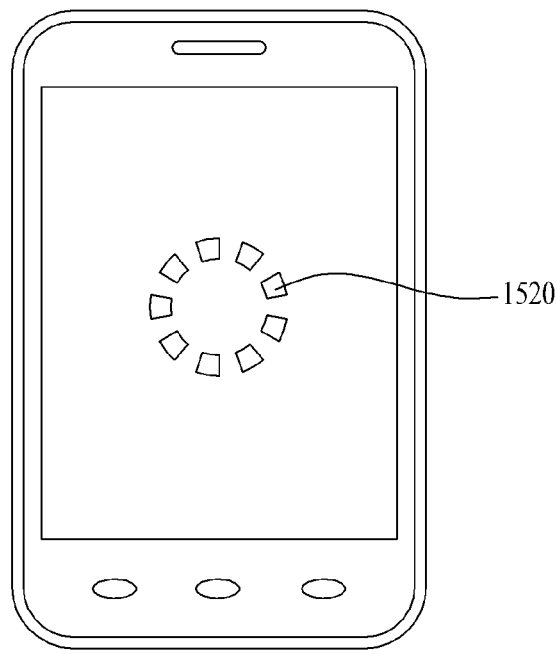

FIG. 15 illustrates an exemplary case when the above-described certification number inputting procedure is omitted according to another exemplary embodiment of the present invention. As described above, a procedure for recording pairing information between a specific display device and a mobile device in an electronic tag was described with reference to FIG. 9 to FIG. 14. Hereinafter, FIG. 15 will be described in detail under the assumption of the same case.

Herein, pairing information between a specific display device and a mobile device is stored in an electronic tag, as shown in (a) of FIG. 15, and the mobile device outputs a specific content 1510, which is currently being outputted. At this point, as shown in (a) of FIG. 15, it will be assumed that the electronic tag is touched to the mobile device.

Accordingly, as shown in (b) of FIG. 15, the mobile device outputs a loading screen 1520. While outputting the loading screen, the mobile device attempts to establish communication connection with the specific display device by using the pairing information, which is recorded in the electronic tag. This example is advantageous in that the certification number inputting procedure, which is described above with reference to FIG. 9 to FIG. 14, is omitted.

Figure 16:
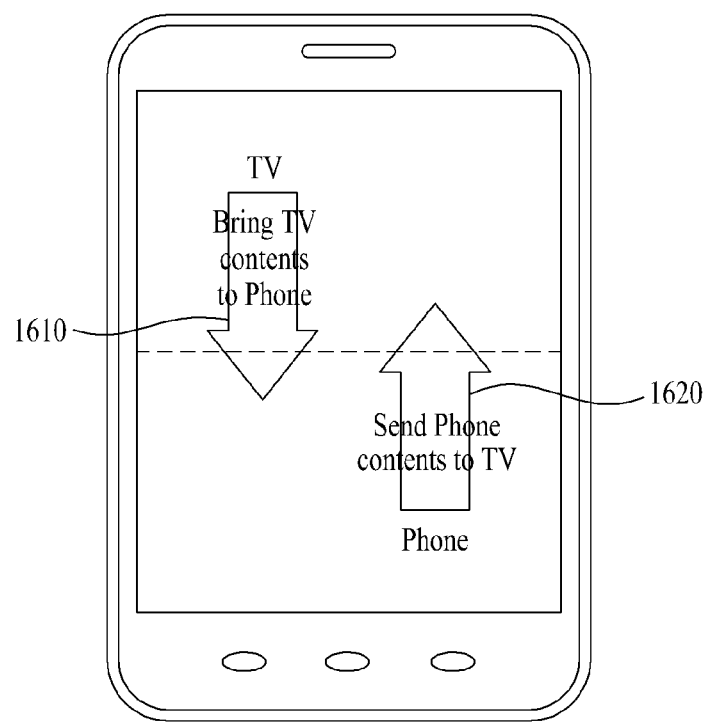
FIG. 16 illustrates a Graphical User Interface (GUI) for deciding a transmission direction of contents that are currently being outputted according to the exemplary embodiment of the present invention.

FIG. 16 illustrates a Graphical User Interface (GUI) for deciding a transmission direction of contents that are currently being outputted according to the exemplary embodiment of the present invention.

As described above, the present invention relates to a technology of sharing contents between a display device and a mobile device. As shown in FIG. 16, a graphic image having the shape of an arrow and guidance messages 1610 and 1620 indicating specific directions may be simultaneously outputted. Accordingly, it is advantageous in that the user may be capable of selecting a wanted transmission direction with more certainty.

Figure 17:
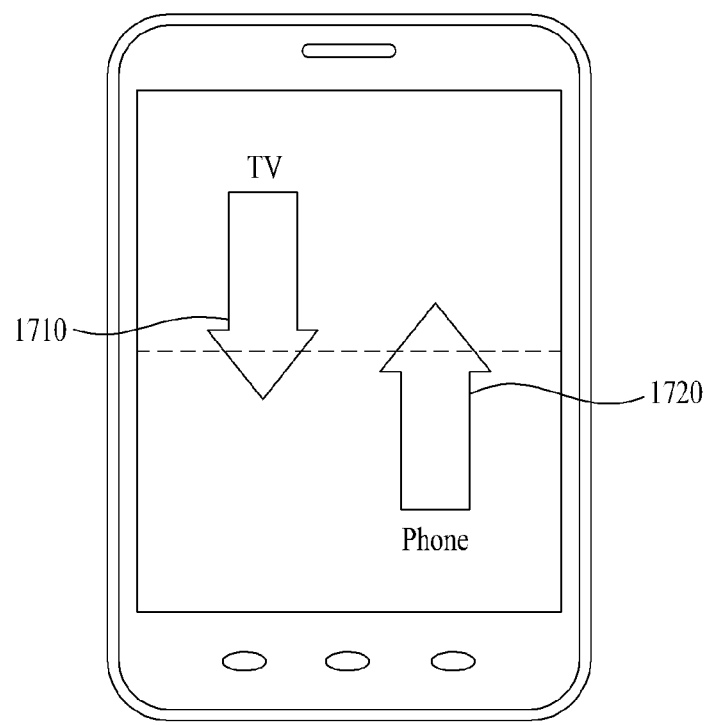
FIG. 17 illustrates a Graphical User Interface (GUI) for deciding a transmission direction of contents that are currently being outputted according to the other exemplary embodiment of the present invention.

FIG. 17 illustrates a Graphical User Interface (GUI) for deciding a transmission direction of contents that are currently being outputted according to the other exemplary embodiment of the present invention.

Unlike the example shown in FIG. 16, referring to FIG. 17, instead of outputting the guidance messages, graphic images 1710 and 1720 each having the shape of an arrow may be simply outputted. Therefore, it is advantageous in that space efficiency in the screen can also be enhanced.

Furthermore, a transmission command may be generated by a method of having the user select the positions of each graphic image shown in FIG. 16 and FIG. 17. Alternatively, the generation of the transmission command may be limited to only when the user touches the screen along the direction of the arrow respective to the graphic image. Both cases are included in the scope of the present invention.

FIG. 18 to FIG. 21 collectively illustrate an exemplary process of transmitting contents that are currently being outputted through the mobile device according to the exemplary embodiment of the present invention. Hereinafter, a process of outputting the same content, which is currently being outputted from the mobile device according to the embodiment of the present invention, from the display device will be described with reference to FIG. 18 to FIG. 21.

Figure 18:
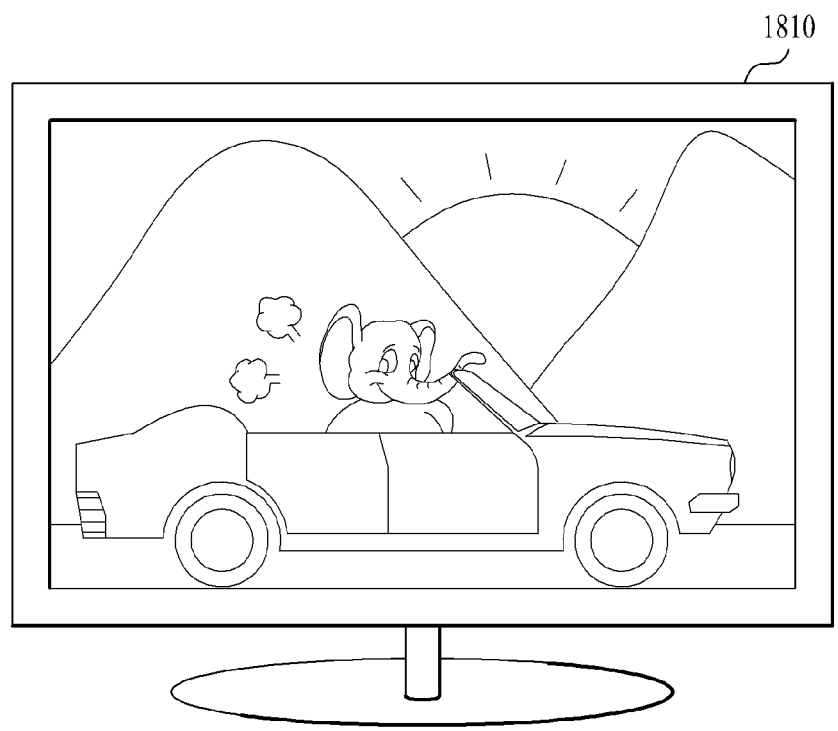
FIG. 18 to FIG. 21 collectively illustrate an exemplary process of transmitting contents that are currently being outputted through the mobile device according to the exemplary embodiment of the present invention.
Figure 18:
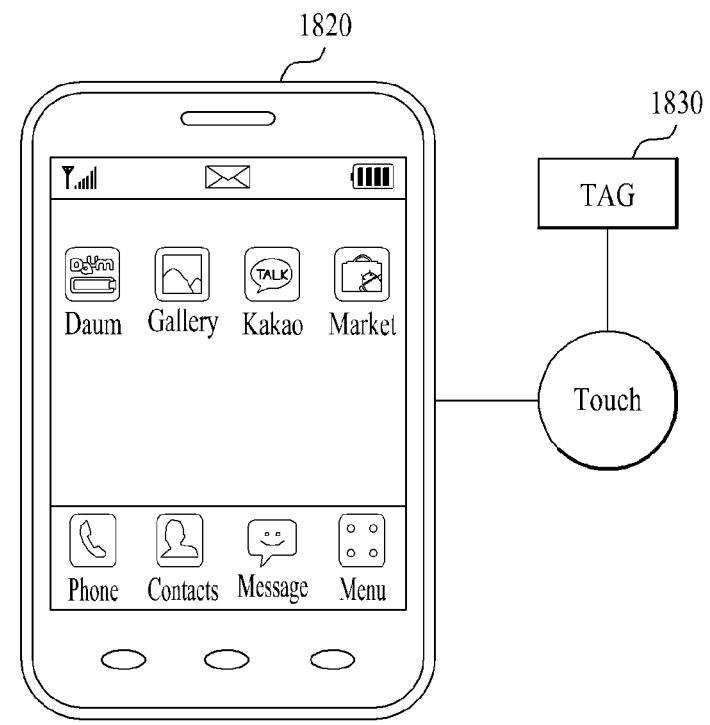

First of all, as shown in FIG. 18, each of the display device 1810 and the mobile device 1820 outputs a different content. At this point, it will be assumed that the mobile device 1810 has touched the electronic tag 1830. Herein, the pairing information for establishing a communication connection between the mobile device and the display device is pre-stored in the electronic tag 1830.

Figure 19:
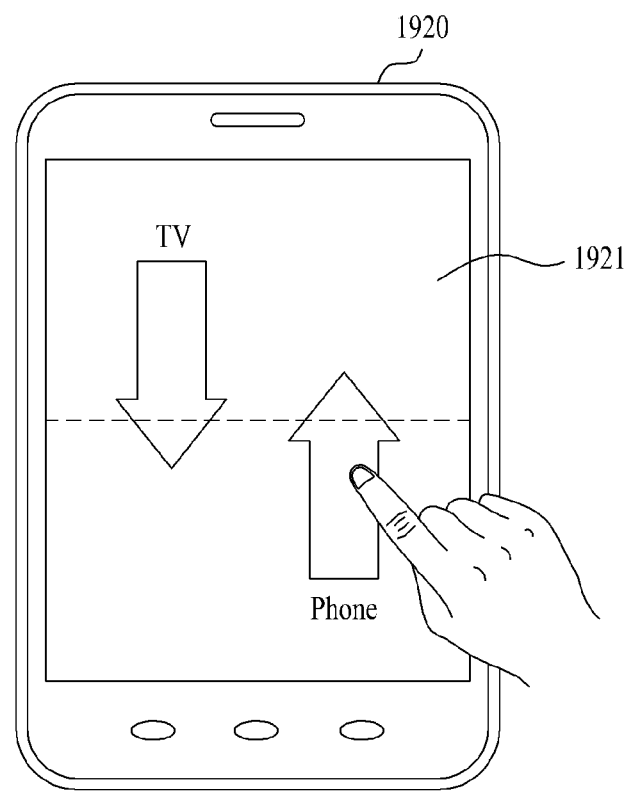

When the mobile device 1820 shown in FIG. 18 is touched to the electronic tag 1830, the mobile device 1920 displays a guidance message 1921 instead of the content currently being outputted, as shown in FIG. 19. As described above in other drawings, the guidance message 1921 shown in FIG. 19 is designed to include an option for transmitting content, which is currently being outputted through the mobile device, to the display device and, conversely, an option for transmitting content, which is currently being outputted through the display device, to the mobile device. Referring to FIG. 19, for example, it will be assumed that the user has selects the option for transmitting content, which is currently being outputted through the mobile device, to the display device.

Figure 20:
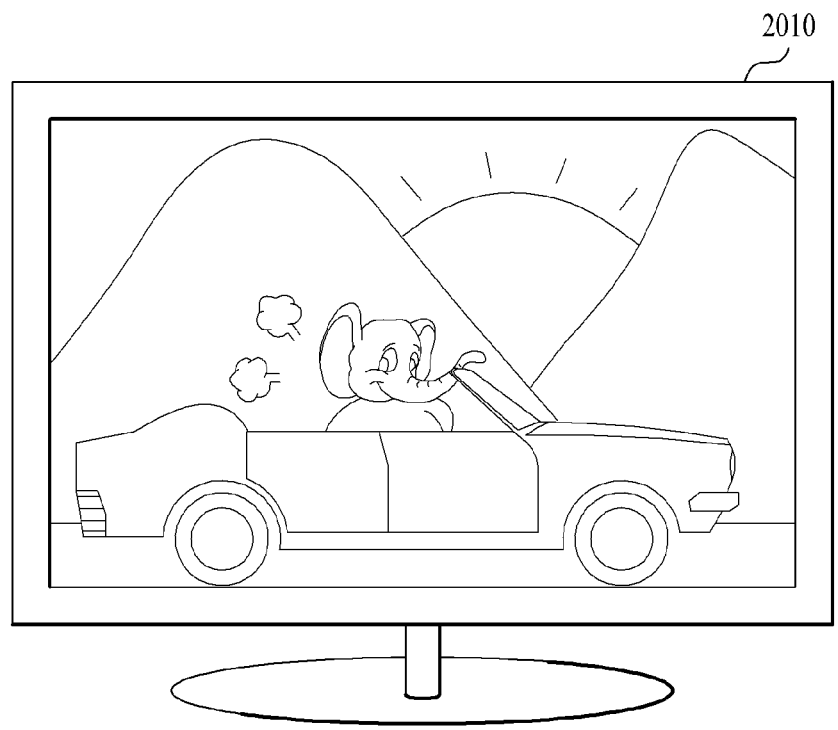
Figure 20:
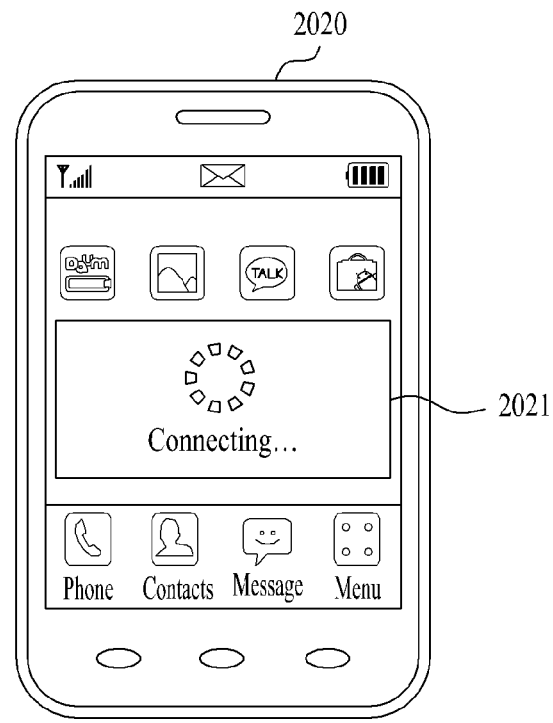

At this point, as shown in FIG. 20, the mobile device 2020 outputs a guidance message 2021 indicating that the mobile device 2020 is on stand-by (or waiting). This prevents the user from accessing any other function. Additionally, the display device 2010 may also output a guidance message indicating that the corresponding device is currently waiting for connection or may maintain the content being outputted from the display device 2010.

Figure 21:
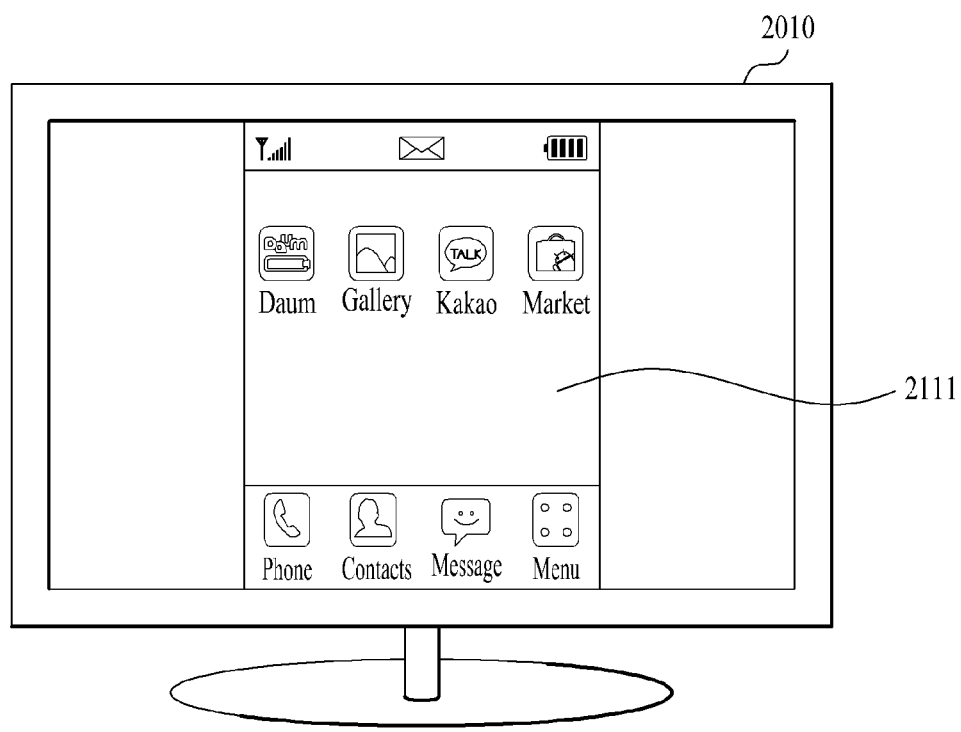
Figure 21:
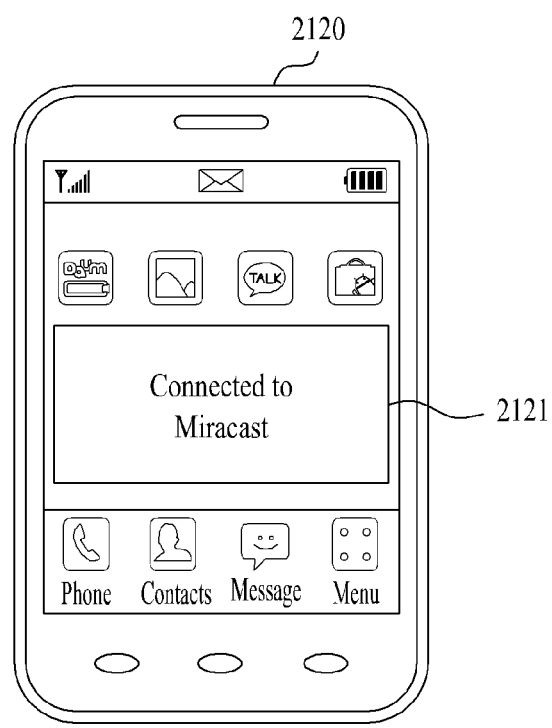

Additionally, when the above-described preparation and/or waiting process, which is described above with reference to FIG. 20, is completed, the display device 2110 may also output the same display screen 2111 as the current display screen of the mobile device 2120, as shown in FIG. 21. Furthermore, by additionally displaying a guidance message 2121 indicating that the connection of the mobile device is completed, user convenience may also be enhanced.

FIG. 22 to FIG. 25 collectively illustrate an exemplary process of transmitting contents that are currently being outputted through the mobile device according to the other exemplary embodiment of the present invention. Unlike the example described above with reference to FIG. 18 to FIG. 21, FIG. 22 to FIG. 25 illustrate an embodiment of the present invention corresponding to an example of preparing for a case when the display device is currently executing a critical task. For example, when the display device corresponds to a TV, and when the TV is shared with a plurality of other users, when a screen change occur abruptly without notice, unexpected damage may be caused to the other users.

Figure 22:
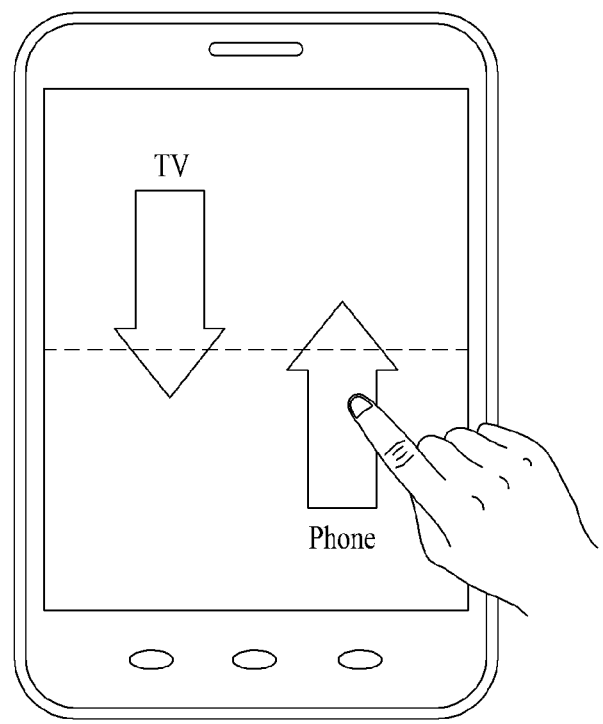
FIG. 22 to FIG. 25 collectively illustrate an exemplary process of transmitting contents that are currently being outputted through the mobile device according to the other exemplary embodiment of the present invention.
Figure 23:
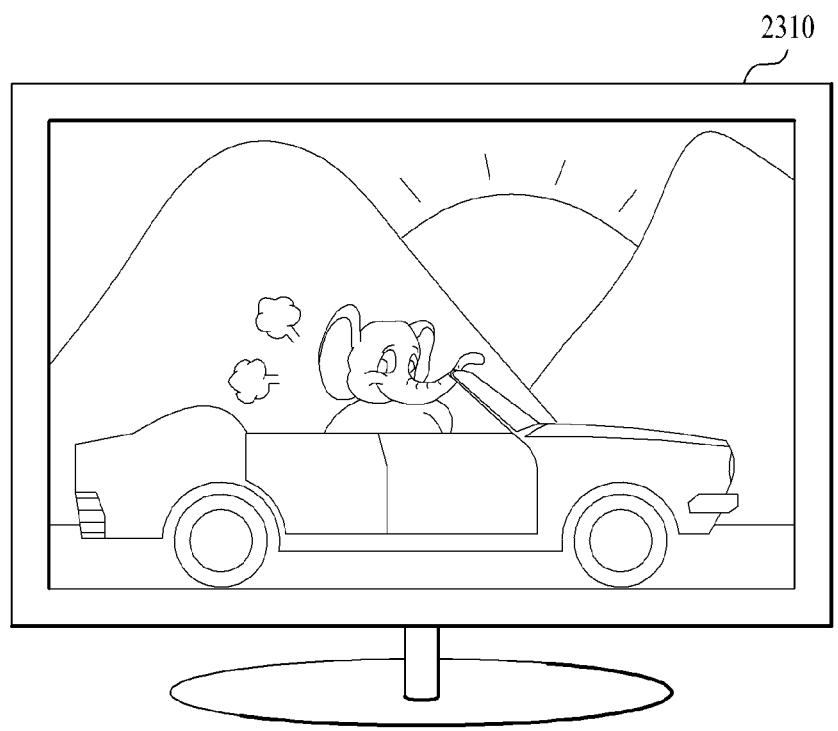
Figure 23:
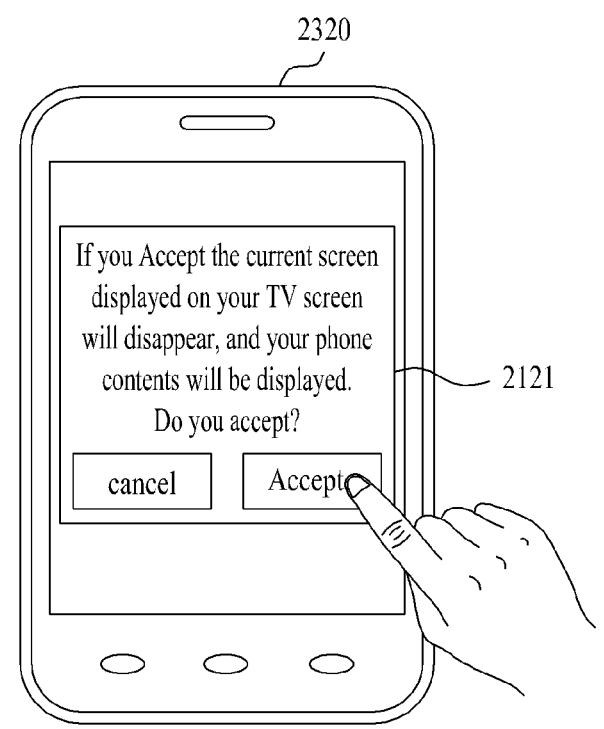

First of all, as shown in FIG. 22, when the user selects a command of transmitting the content, which is currently being outputted from the mobile device, to the display device, the display screen 2310 of the display device 2310 does not change immediately, as shown in FIG. 23. Referring to FIG. 23, the mobile device 2320 outputs a guidance message 2321 allowing the user to once again confirm the change in the display screen of the display device.

Figure 24:
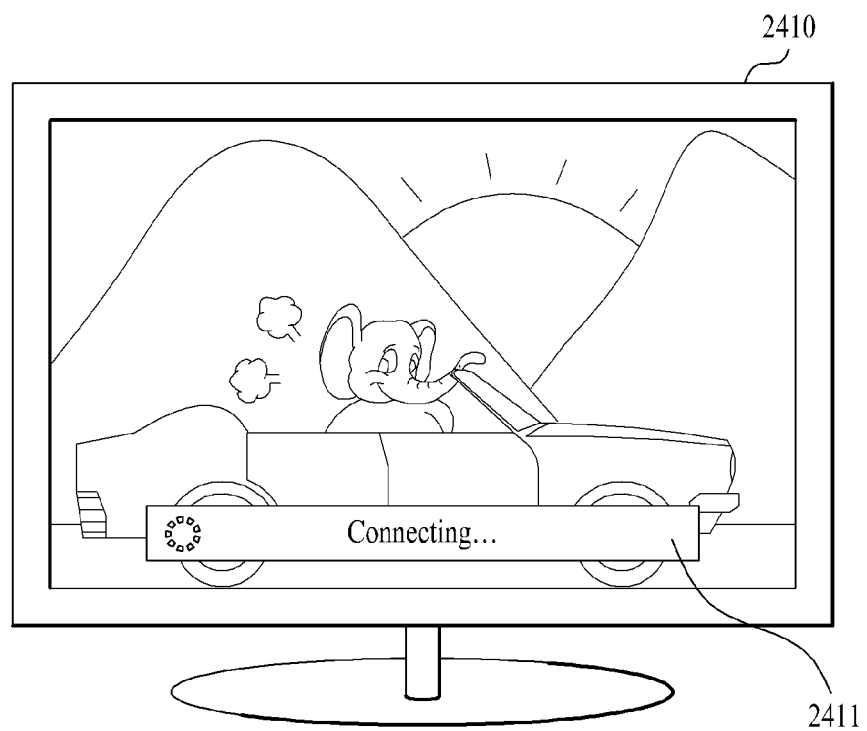
Figure 24:
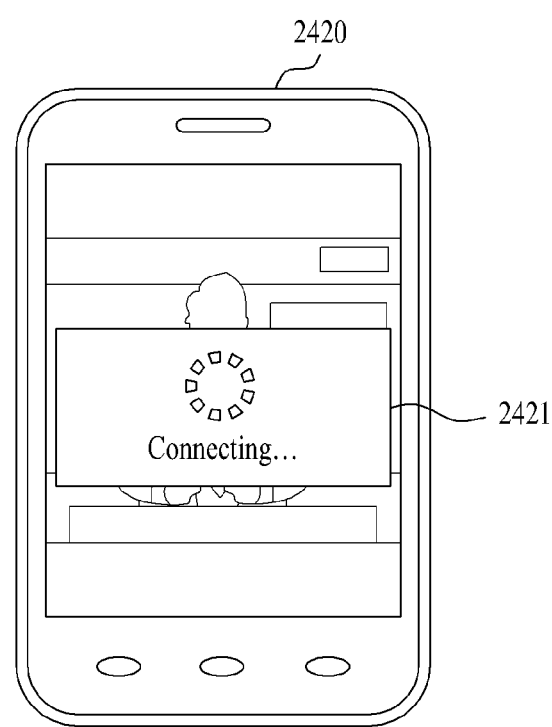

Once the confirmation is made, as shown in FIG. 24, the mobile device 2420 outputs a guidance message 2421 indicating that the mobile device 2420 is currently waiting for connection, and the display device 2410 may also output a guidance message 2411 indicating that the display device 2410 is currently waiting for connection.

Figure 25:
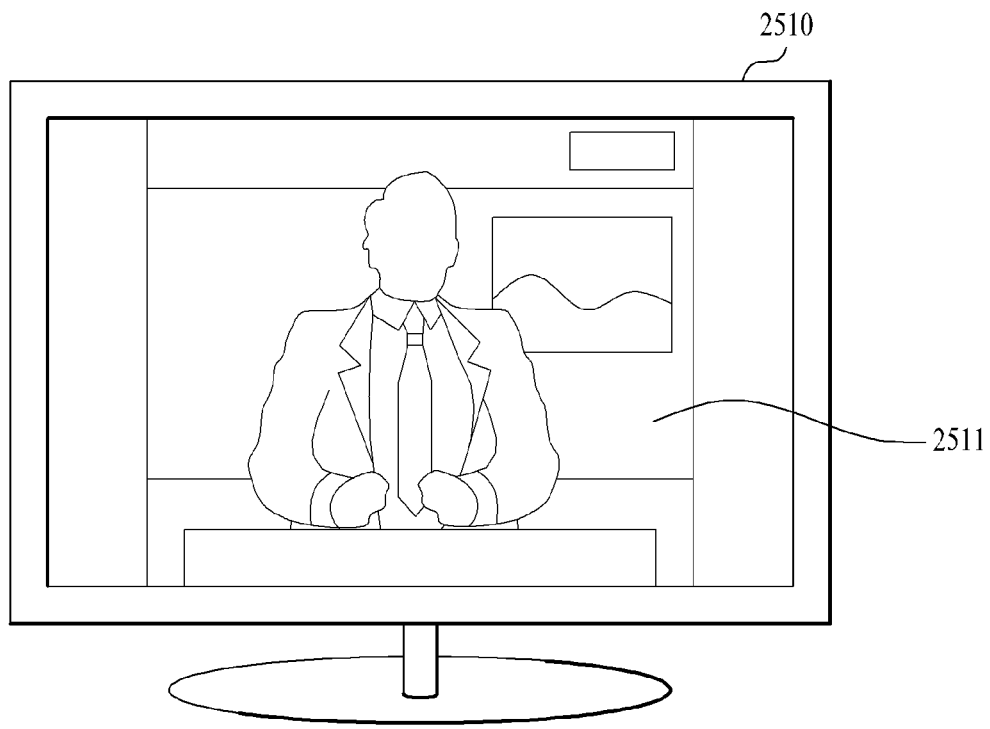
Figure 25:
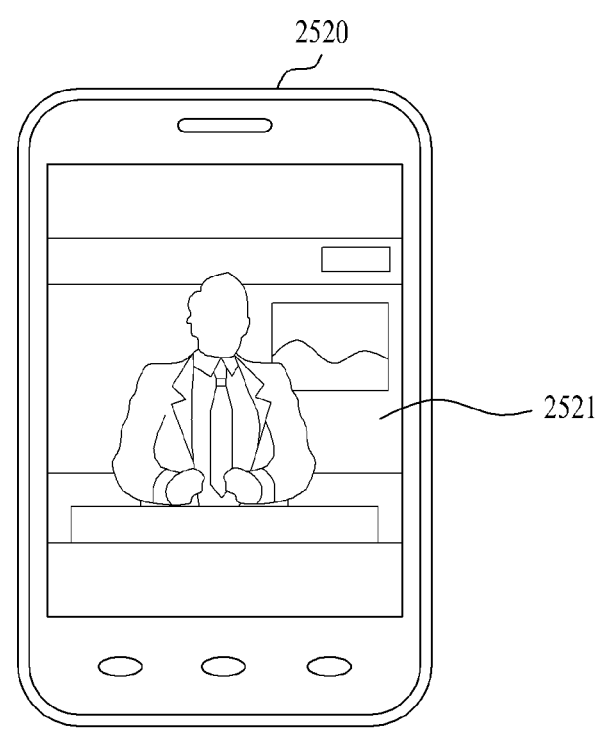

Furthermore, when the communication connection and the content transmission are initiated, as shown in FIG. 25, and when the mobile device 2520 is outputting the current content 2521, the display device 2510 may also output the same display screen 2510. Evidently, the size or resolution of the display screen may be automatically scaled to best fit the respective device.

FIG. 26 to FIG. 29 collectively illustrate a process for resolving problems that may occur, when an application (or software (SW) program) for sharing contents is not stored in the mobile device according to the exemplary embodiment of the present invention.

An application or SW program for implementing the embodiments of present invention, as described above with reference to FIG. 1 to FIG. 25, may be designed to be stored in advance in the memory of each of the mobile device and the display device. Alternatively, the application or SW program for implementing the embodiments of present invention, may also be designed to be selected and downloaded by the user from a specific website after accessing the corresponding website, whenever required or wanted by the user.

Figure 26:
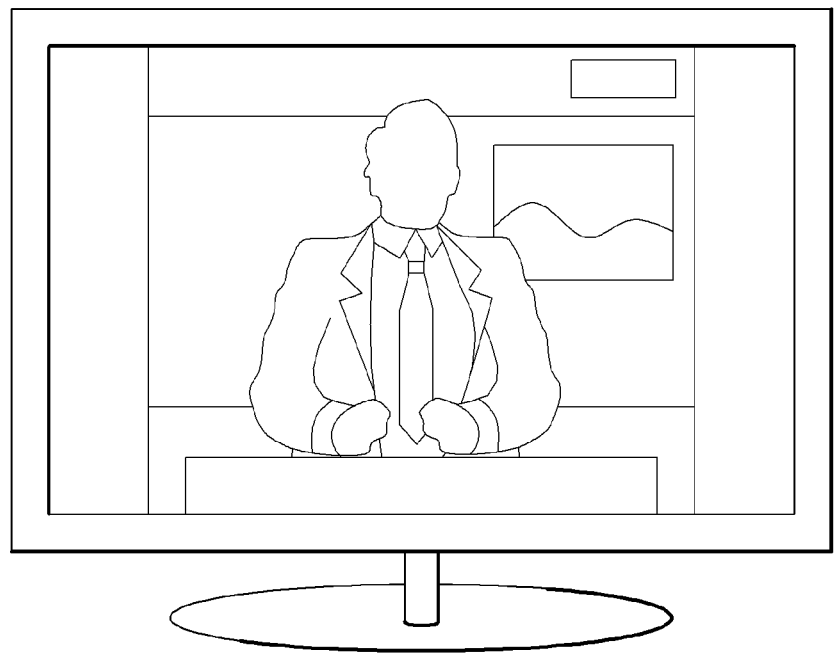
FIG. 26 to FIG. 29 collectively illustrate a process for resolving problems that may occur, when an application (or software (SW) program) for sharing contents is not stored in the mobile device according to the exemplary embodiment of the present invention.
Figure 26:
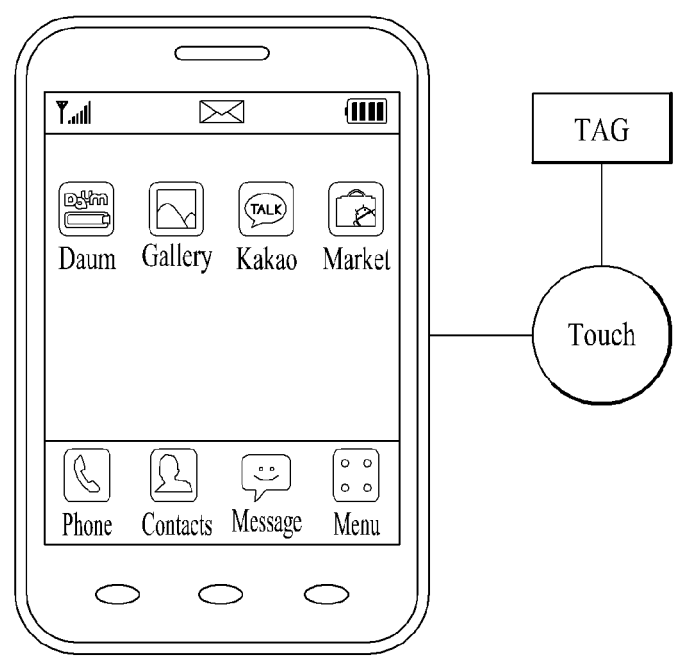

As shown in FIG. 26, by having the mobile device touch the electronic tag, it will be assumed that communication connection between the mobile device and the display device is attempted to be established. Since the procedure is identical to the procedure described above, detailed description of the same will be omitted for simplicity.

Figure 27:
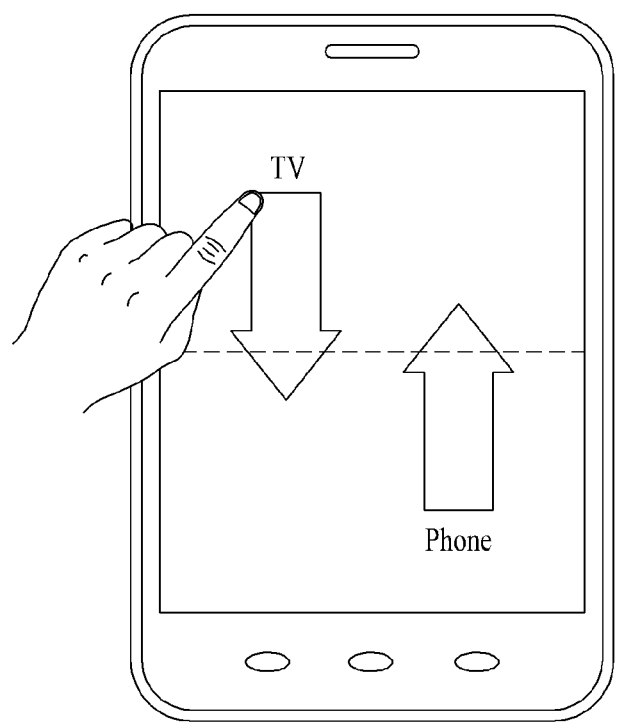

At this point, the mobile device displays a GUI for deciding the transmission direction of the content, as shown in FIG. 27. For example, it will be assumed that the mobile device seeks to receive the content, which is currently being outputted from the display device.

Figure 28:
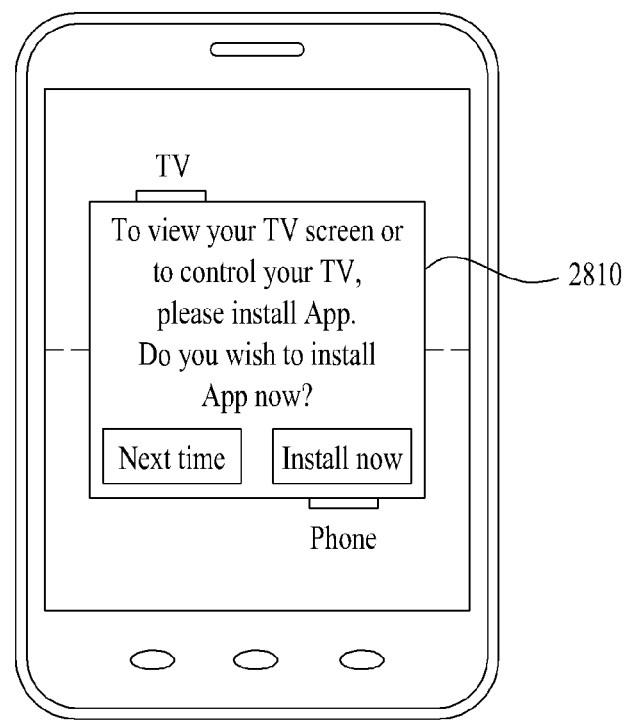
Figure 29:
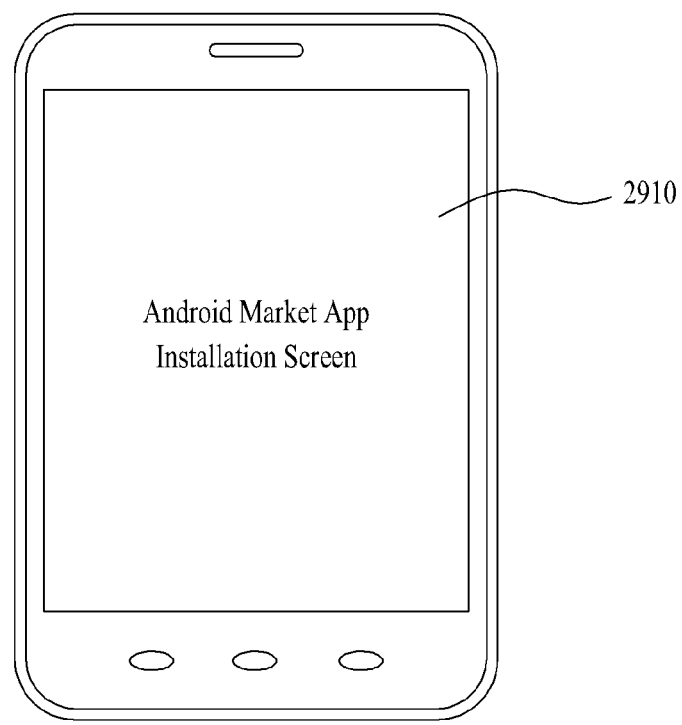

However, in this case, unless the mobile device has already downloaded and stored the application for executing the related function to the memory, the mobile device may display a guidance message 2810 guiding the user to a website, from which the corresponding application can be downloaded, as shown in FIG. 28. Furthermore, depending upon the user's selection, the display screen of the mobile device may be switched (or changed) to an installation screen 2910 of the downloaded application, as shown in FIG. 29.

Figure 30:
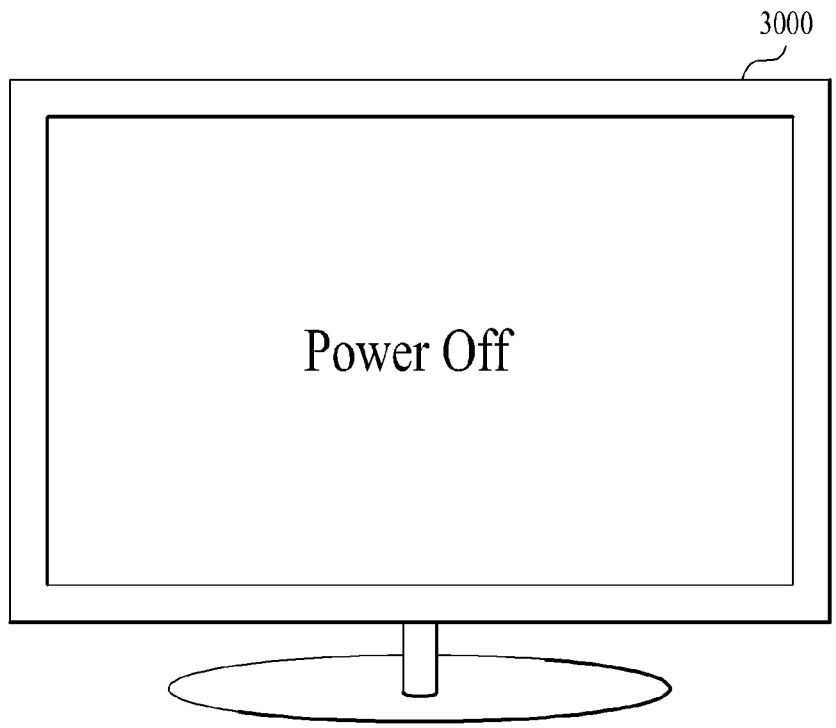
FIG. 30 and FIG. 31 collectively illustrate a process for resolving problems that may occur, when the power of the display device according to the exemplary embodiment of the present invention is in an OFF state.
Figure 30:
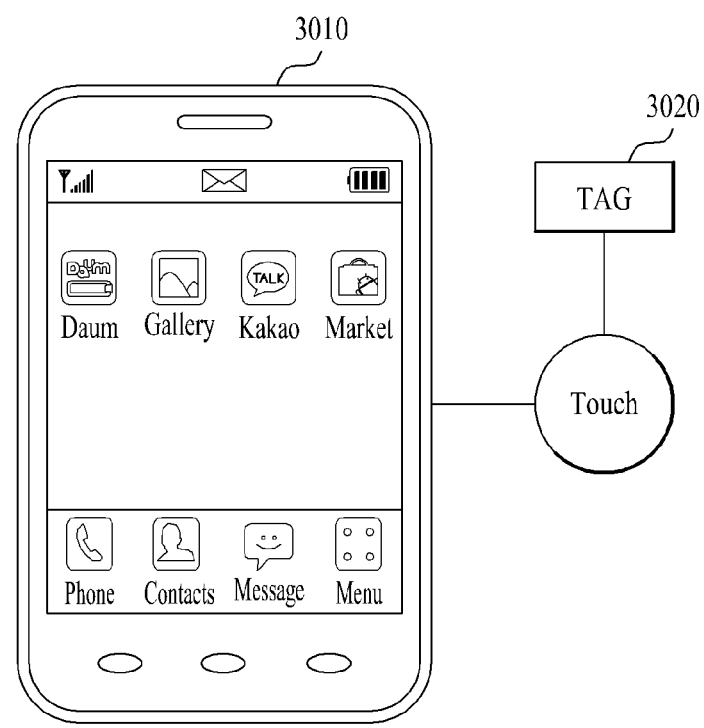
Figure 31:
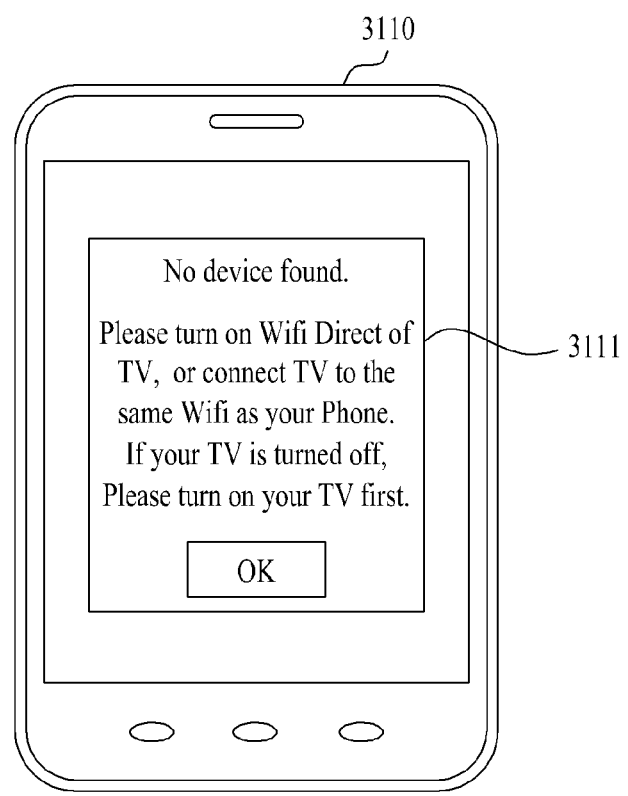

FIG. 30 and FIG. 31 collectively illustrate a process for resolving problems that may occur, when the power of the display device according to the exemplary embodiment of the present invention is in an OFF state.

As shown in FIG. 30, the mobile device 3010 is touched to the electronic tag 3020. And, even if the electronic tag 3020 is provided with pairing information related to the display device 3000, if the display device 3000 is in a power OFF state (or turned off), or if the communication connection (e.g., Wi-Fi/Wi-Fi Direct) status is in an OFF state, it may be difficult to apply the present invention.

Therefore, in order to resolve such problem, as shown in FIG. 31, the mobile device 3110 displays a guidance message 3111 directing the user to change the power status or communication connection status of the display device, with which the content is to be shared, from the OFF state to an ON state. After verifying this process, the user may change the status of the display device.

As described above with reference to FIG. 1 to FIG. 31, when using the exemplary embodiments of the present invention, by using a compact device, i.e., an electronic tag, communication connection between the mobile device and the display device, and third devices may be established more quickly. Herein, the system according to the present invention may be designed to include a number of electronic tags corresponding to the number of display devices. And, furthermore, the electronic tag may be designed to be detachably fixed to the display device.

Herein, it will be apparent that the devices and the method for controlling the same according to the exemplary embodiment of the present invention may be implemented as another embodiment of the present invention by combining one of the appended drawings with another one of the appended drawings, which are described above in detail. Evidently, the newly implemented embodiment of the present invention may also be included in the scope of the present invention.

Meanwhile, the operating method of the electronic device according to the present invention may be realized as a code that can be read by a processor provided in the electronic device in a recording medium that can be read by a processor. The recording medium that can be read by the processor includes all types of recording devices storing data that can be read by the processor. Examples of the recording media that can be read by a processor may include ROMs, RAMs, magnetic tapes, floppy disks, optical data storing devices, and so on. Also, an exemplary recording medium being realized in the form of a carrier wave, such as a transmission via Internet, may also be included. Also, the recording medium that can be read by a processor may be scattered within a computer system, which is connected through a network. And, a code that can be read by the processor may be stored and executed by using a dispersion (or scattering) method.

As described above, the method for controlling a system including an electronic tag, a mobile device, and a display device, and the mobile device and the display device of the same may have the following advantages. According to an exemplary embodiment of the present invention, in order to swiftly establish a connection between at least two or more devices for sharing the same content, a new third device may be defined.

And, according to another exemplary embodiment of the present invention, during the process of establishing connection between the at least two or more devices for sharing the same content, the present invention may provide a solution that can enhance the data processing efficiency and that can minimize unnecessary usage of the memory. Finally, according to yet another embodiment of the present invention, during the process of establishing connection between the at least two or more devices for sharing the same content, the present invention may provide the user with a more convenient and faster user interface.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A first device for communication with a second device, the first device being a mobile device and the second device being a display device, the first device comprising:
    a communication module;
    a screen configured to display a list identifying at least one of external device that has a same access point (AP) as the first device or is available for connection with the first device based on a wireless local area network (WLAN) direct connection; and
    a controller configured to receive a certification number input by a user of the first device and displayed by the second device in response to selecting the second device among the at least one of external device, wherein the certification number is used to connect the first device with the second device, wherein the controller is further configured to control the screen to display a graphical user interface (GUI) for deciding a transmission direction of contents if a number inputted by the first device matches the certification number displayed by the second device, wherein the controller is further configured to control the communication module to transmit the contents displayed on the first device to the second device per user's request and receive the contents displayed on the second device from the second device per user's request according to the GUI, and wherein the first device is connected to the second device based on a Digital Living Network Alliance (DLNA) if a type of the contents corresponds to a moving picture image, and the first device is connected to the second device based on the WLAN direct connection if a type of the contents does not correspond to the moving picture image.

2. The first device of claim 1, wherein the transmission direction is determined based on a flicker movement or touch.

3. The first device of claim 1, wherein the controller is further configured to scale a size or resolution of the contents in order to fit the second device.

4. The first device of claim 1, wherein the controller is further configured to control the screen to display a guidance message for changing a power status or communication connection status of the second device, with which the contents are to be shared, from an OFF state to an ON state.

5. The first device of claim 1, wherein the first device corresponds to a mobile device while the second device corresponds to a television receiver.

6. A second device for communication with a first device, the first device being a mobile device and the second device being a display device, the second device comprising:
 a tuner configured to receive a broadcast signal comprised of audio and video data via a specific channel;
 a user interface unit configured to change the specific channel based on a command received from a remote controlling unit;
 a communication module configured to connect with the first device having a same access point (AP) as the second device or connect with the first device based on a Wi Fi wireless local area network (WLAN) direct connection;
 a display module configured to output a certification number for sharing contents between the first device and the second device while outputting the video data included in the broadcast signal in response to receiving a connection request from the first device; and
 a controller configured to control the communication module to selectively transmit the contents to the first device if a number inputted by the first device matches the certification number displayed by second device, wherein the second device is connected to the first device based on a Digital Living Network Alliance (DLNA) if a type of the contents corresponds to a moving picture image, and the second device is connected to the first device based on the WLAN direct connection if a type of the contents does not correspond to the moving picture image.

7. The second device of claim 6, wherein the controller is further configured to scale a size or resolution of the contents in order to fit the first device.

8. The second device of claim 6, wherein the first device corresponds to a mobile device while the second device corresponds to a television receiver.

* * * * *